United States Patent
Beardsley et al.

(10) Patent No.: US 6,185,638 B1
(45) Date of Patent: Feb. 6, 2001

(54) METHOD AND SYSTEM FOR DYNAMICALLY ASSIGNING ADDRESSES TO AN INPUT/OUTPUT DEVICE

(75) Inventors: Brent Cameron Beardsley, Tucson, AZ (US); Allan Samuel Meritt, Poughkeepsie, NY (US); Michael Aloysius Paulsen, Morgan Hill, CA (US); Harry Morris Yudenfriend, Poughkeepsie, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/167,782

(22) Filed: Oct. 7, 1998

(51) Int. Cl.$^7$ .................................................. G06F 13/00
(52) U.S. Cl. ..................... 710/36; 710/7; 710/3; 711/112; 711/200
(58) Field of Search ........................... 711/112–114, 200; 710/3–7, 20–21, 36–45

(56) References Cited

U.S. PATENT DOCUMENTS

| 4,149,242 | 4/1979 | Pirz | 711/5 |
| 4,408,273 | 10/1983 | Plow | 707/202 |

(List continued on next page.)

FOREIGN PATENT DOCUMENTS

| 58-056058 | 4/1983 | (JP) . |
| 2082378 | 3/1990 | (JP) . |

OTHER PUBLICATIONS

IBM 3990/9390 Storage Control; Document No. GA32–0274–04; Fifth Edition, Oct. 1996 (selected portions of Chapter 2).

IBM 3990 Storage Control Reference (Models 1, 2, and 3); Document No. GA32–0099–06, Seventh Edition, Oct., 1994 (selected portions of Chapters 1, 2, and 4).

IBM Technical Disclosure Bulletin Deleting Objects on Worm Media, vol. 32, No. 7, Dec. 1989.

IBM Technical Disclosure Bulletin Separate Write/Read Logical Paths to Optimize Library Network File System Data Rates, vol. 37, No. 09, Sep. 1994.

U.S. application No. 09/168,017, filed Oct. 7, 1998 (Atty. Dkt. No. TU9–958–018 18.26).

U.S. application No. 09/167,860, filed Oct. 7, 1998 (Atty. Dkt. No. TU9–98–025 18.32).

U.S. application No. 09/197,605, filed Oct. 7, 1998 (Atty. Dkt. No. TU9–98–037 18.36).

U.S. application No. 09/167,603, filed Oct. 7, 1998 (Atty. Dkt. No. TU9–98–061 18.39).

*Primary Examiner*—Christopher B. Shin
(74) *Attorney, Agent, or Firm*—David W. Victor, Esq.; Konrad Raynes & Victor LLP

(57) ABSTRACT

Disclosed is a system for dynamically assigning alias addresses to base addresses referencing an I/O device, such as a direct access storage device (DASD). In the system, at least one base control block indicates a base address and a plurality of alias control blocks indicate a plurality of alias addresses. Each control block is associated with an address for addressing an I/O device. A processing unit, such as a host computer system, processes at least one alias control block associated with the I/O device and determines a base control block associated with the I/O device with which the alias control blocks are associated. The processing unit then binds at least one alias control block to the determined base control block. The bound base and alias control blocks provide different addresses to address the same I/O device. Further, the bound base and alias addresses address the same I/O device for subsequent I/O operations until the processing unit detects a reassignment of the association of base and alias addresses.

58 Claims, 14 Drawing Sheets

U.S. PATENT DOCUMENTS

| | | | |
|---|---|---|---|
| 4,453,211 | | 6/1984 | Askinazi et al. ............... 703/24 |
| 5,097,410 | | 3/1992 | Hester et al. ............... 710/14 |
| 5,197,069 | | 3/1993 | Cook et al. ............... 714/2 |
| 5,261,072 | | 11/1993 | Siegel ............... 710/22 |
| 5,274,773 | | 12/1993 | Squires et al. ............... 710/38 |
| 5,276,826 | | 1/1994 | Rau et al. ............... 711/5 |
| 5,333,315 | | 7/1994 | Saether et al. ............... 707/1 |
| 5,388,219 | * | 2/1995 | Chan et al. ............... 710/72 |
| 5,392,443 | | 2/1995 | Sakakibara et al. ............... 712/9 |
| 5,404,474 | | 4/1995 | Crook et al. ............... 711/212 |
| 5,418,921 | * | 5/1995 | Cortney et al. ............... 64/222.82 |
| 5,488,707 | | 1/1996 | Phillips et al. ............... 711/200 |
| 5,493,668 | * | 2/1996 | Elko et al. ............... 711/130 |
| 5,493,724 | * | 2/1996 | Cohn et al. ............... 710/38 |
| 5,528,764 | | 6/1996 | Heil ............... 710/107 |
| 5,530,897 | | 6/1996 | Meritt ............... 710/9 |
| 5,553,285 | | 9/1996 | Krakauer et al. ............... 711/100 |
| 5,564,019 | * | 10/1996 | Beausoleil et al. ............... 709/215 |
| 5,568,629 | | 10/1996 | Gentry et al. ............... 711/114 |
| 5,581,768 | | 12/1996 | Garney et al. ............... 709/104 |
| 5,640,591 | | 6/1997 | Rosenthal et al. ............... 710/3 |
| 5,664,152 | | 9/1997 | Ezzett ............... 711/153 |
| 5,680,580 | | 10/1997 | Beardsley et al. ............... 711/114 |
| 5,701,429 | * | 12/1997 | Legvold et al. ............... 711/114 |
| 5,765,200 | * | 6/1998 | McIlvain et al. ............... 711/170 |
| 5,860,138 | | 1/1999 | Engebretsen et al. ............... 711/202 |
| 5,862,363 | * | 1/1999 | Taroda et al. ............... 395/500 |
| 5,893,918 | * | 4/1999 | Beardsley et al. ............... 711/112 |

* cited by examiner

Fig. 5

| Channel Subsystem 20 | | | | | | | | | | |
|---|---|---|---|---|---|---|---|---|---|---|
| Subchannel | 0 | 1 | 2 | 3 | ...7... | ...16... | ...22... | ...99... | | |
| Unit Address (UA) | | | | | 14 | 25 | 333 | 12 | | |
| Device No. | | | | | FFF0 | FF26 | 0053 | 0414 | | |
| SCHIB | | | | | | | | | | |

42

METHOD AND SYSTEM FOR DYNAMICALLY ASSIGNING ADDRESSES TO AN INPUT/OUTPUT DEVICE

CROSS-REFERENCE TO RELATED APPLICATIONS

This application is related to the following co-pending and commonly-assigned patent applications, all of which are filed on the same date herewith, and all of which are incorporated herein by reference in their entirety:

"System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, U.S. application Ser. No. 09/168,017, "Input/Output Operation Request Handling in a Multi-Host System," by Brent C. Beardsley, Joseph C. Elliot, and James L. Iskiyan, U.S. application Ser. No. 09/167,860; "Method and System for Reassigning Addresses To An Input/Output Device," by Brent C. Beardsley, Allan S. Merritt, Michael A. Paulsen, and Harry M. Yudenfriend, U.S. application Ser. No. 09/167,603; and "Defining Characteristics Between Processing Systems," by Brent C. Beardsley, John T. Flynn, Michael A. Paulsen, Harry M. Yudenfriend, U.S. application Ser. No. 09/167,605.

BACKGROUND OF THE INVENTION

1. Field of the Invention

The present invention relates to a method and system for assigning alias to base addresses to provide multiple addresses to allow concurrent, multiple I/O operations directed toward the same I/O device.

2. Description of the Related Art

FIG. 1 illustrates a hardware environment of a channel subsystem 2 included in a host system 4 providing communication between CPUs 6a, b and I/O devices 10a, b, c. A storage controller 8 controls access to the I/O devices 10a, b, c. The host system 4 communicates with the storage controller 8 via the channel subsystem 2 and subchannels 14a, b, c therein. The host system 4 includes CPUs 6a, b that contain the sequencing and processing facilities for instruction execution, interruption action, timing functions, initial program loading, and other machine-related functions. The CPUs 6a, b may be host systems. The I/O devices 10a, b, c may be comprised of printers, magnetic-tape units, direct-access-storage devices (DASDs), displays, keyboards, communications controllers, teleprocessing devices, and sensor-based equipment. The storage controller 8 regulates and controls data transfers to the I/O devices 10a, b, c. The storage controller 8 function may be a separate stand alone machine, such as the IBM 3990 Storage Controller, or housed within the I/O device 10a, b, c or within the host system 4. In certain systems, the host system 4 may view the storage controller 8 as a multitude of separate control unit images or logical subsystems (LSSs), wherein each control unit image provides access to one or more I/O devices 10a, b, c. The storage controller 8 may include multiple control unit images, i.e., LSSs, each of which may address up to 256 I/O devices.

The CPUs 6a, b and the channel subsystem 2 may access a main storage 12. Programs and data maintained in the I/O devices 10a, b, c such as storage drives, must be loaded into the main storage 12 before the CPUs 6a, b can process such programs and data. The main storage 12 may include a fast access buffer or cache. I/O operations involve the transfer of data between the main storage 12 and the I/O devices 10a, b, c. The channel subsystem 2 directs the flow of data between the storage controller 8 and the main storage 12. The channel subsystem 2 relieves the CPUs 6a, b of handling I/O operations and permits the CPUs 6a, b to devote processing cycles to other operations while the channel subsystem 2 concurrently handles data transfers. In typical implementations, the CPUs 6a, b, the main storage 12, and the channel subsystem 2 are all located within a single host 4 that is attached to a single storage controller 8, such as the IBM 3990 Storage Controller.

Channel paths 13 provide data communication between the channel subsystem 2 and the storage controller 8. The channel paths 13 may employ a parallel-transmission protocol or a serial-transmission protocol. The storage controller 8 includes control logic to physically access the I/O devices 10a, b, c and control data transfer. In preferred embodiments, multiple channel paths 13 may be dedicated for communication with a particular I/O device 10a, b, c.

A subchannel 14a, b, c is dedicated to each I/O device 10a, b, c accessible to the channel subsystem 2, i.e., there is a one-to-one relationship between subchannels 14a, b, c and I/O devices 10a, b, c. Each subchannel 14a, b, c consists of internal storage and includes information relating the I/O devices 10a, b, c to the channel subsystem 2. The channel subsystem 2 uses the information in the subchannels 14a, b, c to access the I/O devices 10a, b, c. The subchannels 14a, b, c are assigned to the I/O devices 10a, b, c at initialization. The subchannels 14a, b, c maintain information such as the channel command word (CCW), channel-path identifier, device number, etc., concerning operations initiated with respect to the I/O device 10a, b, c represented by the subchannel 14a, b, c. I/O devices 10a, b, c that are attached to the channel subsystem 2 by multiple channel paths 13 may be accessed using any of the available channel paths 13. An I/O device 10a, b, c is addressed by channel-path identifiers (CHPIDs) identifying the path to a device, subchannel numbers identified the subchannel 14a, b, c associated with the device, and a device number uniquely identifying the I/O device 10a, b, c to the host system 4. The IBM S/390 operating system allows for dynamic-reconnection, wherein the storage controller 8 may select any channel path 13 leading to the host system 4 when logically reconnecting to the channel subsystem 2.

The main storage 12 includes unit control blocks (UCBs) which include information on the subchannels and I/O devices. The CPUs 6a, b may access the UCB information when initiating I/O operations.

The channel subsystem 2 may receive numerous I/O operations from CPUs 6a, b directed toward the I/O devices 10a, b, c. The channel subsystem 2 initiates a channel program which comprises a series of channel commands to access and perform the I/O operation requested by the host system 4. An I/O operation toward a volume operates through the execution of a series of linked channel command words (CCW). The CCW designates the storage area associated with the operation, the action to be taken whenever transfer to or from the area is completed, and other options. A CCW command includes different fields, including: a command code that specifies the operation to be performed, e.g., write, read, read backward, control, sense, sense ID, and transfer in channel; and an address field designating a location in absolute storage, otherwise referred to as a data storage address of where the I/O operations and commands are maintained in main memory 12, and chain command information specifying whether commands are chained together. With each chain of commands, a define extent command may be provided indicating the permissible I/O operations that may be performed and a locate record command indicating the actual I/O operation to be performed. The chain of CCW commands may operate within the defined extent range. A description of these commands is provided in the IBM publication, "IBM 3990/9390 Storage Control Reference," IBM Document no. GA32-0274-04 (Copyright IBM, 1994, 1996), which publication is incorporated herein by reference in its entirety.

A subchannel 14a, b, c establishes an active allegiance for a channel path when active communication is initiated with the I/O device 10a, b, c on the channel path. In current systems, the subchannel 14a, b, c can have an active allegiance to only one channel path at a time. While a subchannel 14a, b, c has an active allegiance on a channel path 13 to an I/O device 10a, b, c, the channel subsystem 2 does not actively communicate with that device on any other channel path. Thus, there is only one path of communication, and hence one channel program, directed toward an I/O device 10a, b, c at a given time even though there may be multiple dynamic channel paths 13 leading to the I/O device 10a, b, c. Although dynamic channel pathing provides multiple paths from the channel subsystem 2 to the storage controller 8, only one of the dynamic paths is used at a time to communicate with the I/O device 10a, b, c. The dynamic paths are used to provide an alternative path for reconnecting the storage controller 8 and the I/O device 10a, b, c to the host system 4. In preferred embodiments, the storage controller 8 selects the path for reconnection. In the prior art, execution of a channel program for a single host system along multiple paths would likely create device-busy conditions detectable by the channel subsystem and cause unpredictable results.

Thus, with prior art servers employing the channel subsystem architecture of the IBM ESA/390 server and other similar server systems known in the art, a single host system cannot direct concurrent, multiple I/O operations toward the same volume, i.e., I/O device. In the current art, to execute multiple channel programs toward the same I/O device 6a, b, the channel program operations must be queued and executed serially; multiple channel programs cannot be executed at once toward the same I/O device 6a, b. Otherwise, if the multiple I/O tasks return data from the same device to a single host, the host could not relate the data to the completed I/O task because the host cannot distinguish on the basis of the address of the target I/O device 6a, b. Prior art systems are described in the IBM publications "ESA/390 Principles of Operation," IBM document no. SA22-7201-04 (IBM Copyright 1990, 1991, 1993, 1994, 1996, 1997), and U.S. Pat. Nos. 5,197,069 and 5,530,897, assigned to IBM, which publications and patents are incorporated herein by reference in their entirety.

SUMMARY OF THE PREFERRED EMBODIMENTS

To overcome the limitations in the prior art described above, the present invention discloses a system for addressing an input/output (I/O) device. A first processing unit queries a second processing unit for information on base and associated alias addresses for at least one I/O device. The first processing unit processes the queried information to generate at least one base control block indicating a base address and a plurality of alias control blocks indicating a plurality of alias addresses. Each control block is associated with an address for addressing an I/O device. The first processing unit processes at least one alias control block associated with the I/O device and determines a base control block associated with the I/O device with which the alias control blocks are associated. The first processing unit then binds at least one alias control block to the determined base control block. The bound base and alias control blocks provide different addresses to address the same I/O device.

In further embodiments, the first processing unit is a storage controller, the I/O device is a logical volume included in a storage device comprised of multiple logical volumes, and the base and alias addresses address logical volumes.

In still further embodiments, at least one base control block indicates a base address and a plurality of alias control blocks indicate a plurality of alias addresses. Each control block is associated with an address for addressing an I/O device. At least one alias control block associated with the I/O device is processed and a base control block associated with the I/O device with which the alias control blocks are associated is determined. An alias control block is then bound to the determined base control block. The bound base and alias control blocks provide different addresses to address the same I/O device and the bound base and alias addresses address the same I/O device for subsequent I/O operations until a reassignment of the association of base and alias addresses is detected.

Still further embodiments concern a system implemented within a control unit for addressing an input/output (I/O) device and for communicating with a processing unit. A memory area accessible to the control unit provides a base address and a plurality of alias addresses for addressing the I/O device. The alias addresses associated with the base address provide an address for addressing the I/O device addressed by the base address. The control unit receives a request from the processing unit for information on the assignment of base and alias addresses to the I/O device and transmitting information on the assignment of base and alias addresses for the I/O device to the processing unit after receiving the request from the processing unit. The processing unit uses the assignment information for configuration purposes.

Preferred embodiments thus provide a method and system to dynamically associate alias addresses to base addresses to provide multiple addresses for addressing an I/O device.

BRIEF DESCRIPTION OF THE FIGURES

Referring now to the drawings in which like reference numbers represent corresponding parts throughout:

FIG. 5 illustrates information maintained within the host system in accordance with preferred embodiments of the present invention;

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Hardware and Software Environment

Figure 1:
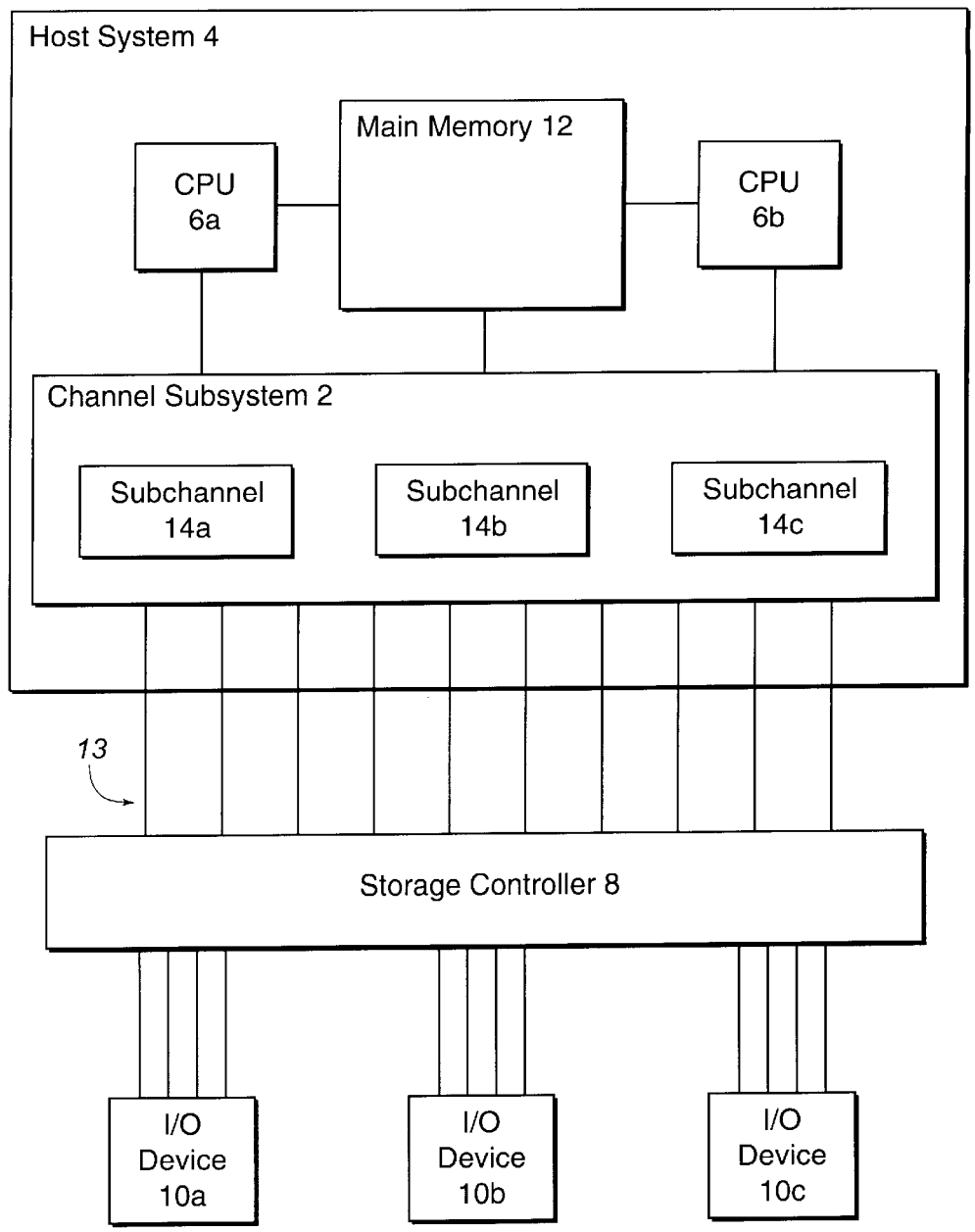
FIG. 1 illustrates a prior art system for handling I/O operations.
Figure 2:
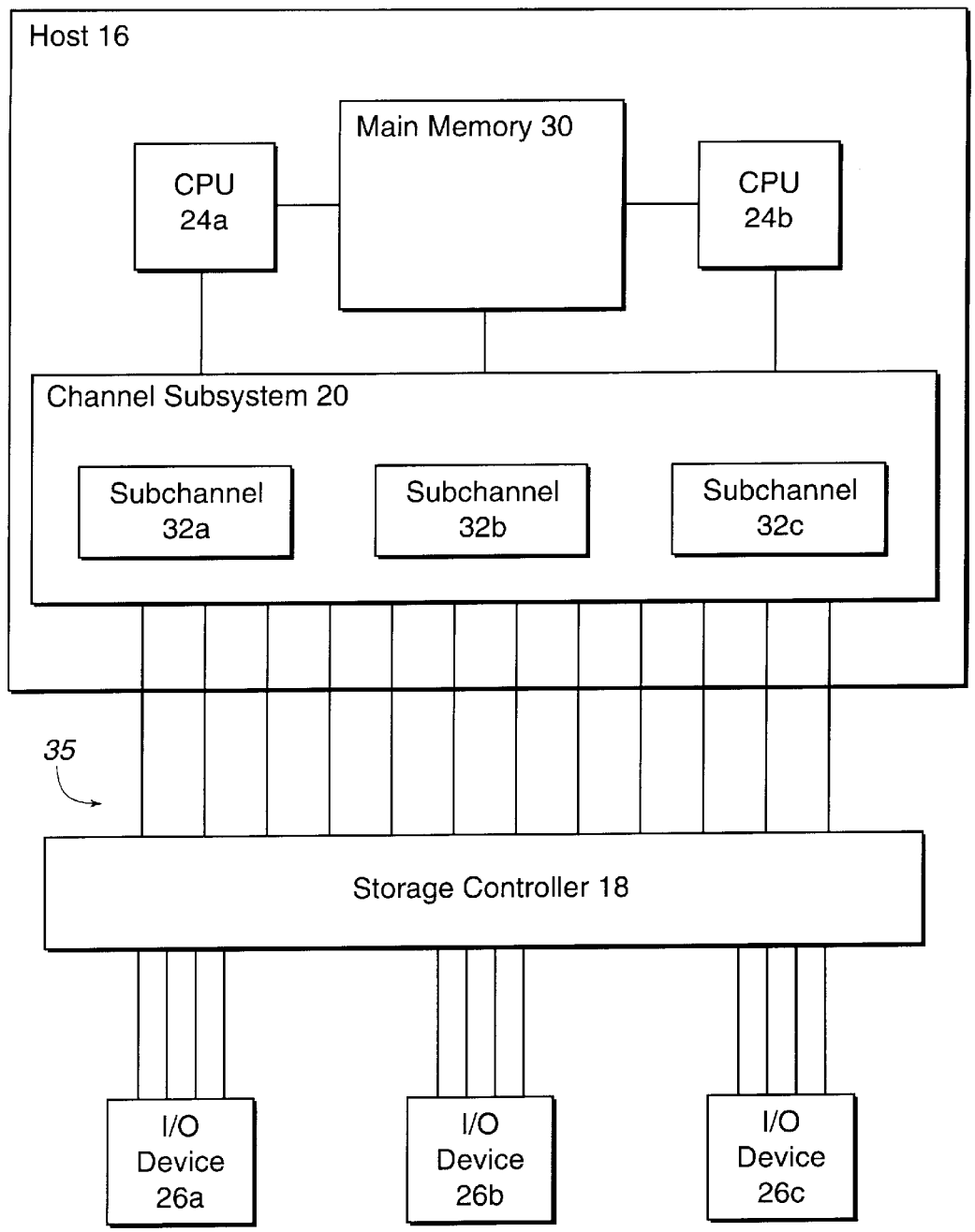
FIG. 2 illustrates a preferred hardware and software structure in which preferred embodiments of the present invention are implemented.

FIG. 2 illustrates a preferred hardware and software environment in which preferred embodiments are implemented. A host system 16 is in communication with a storage controller 18. The host system 16 views the storage controller 18 as a channel subsystem 20 that interfaces the CPUs 24a, b in the host 16 with I/O devices 26a, b, c. The host may have more than the two CPUs 24a, b shown in FIG. 2. Moreover, in preferred embodiments the CPUs 24a, b are capable of multi-tasking and each CPU 24a, b can simultaneously issue parallel execution paths. The channel subsystem 20 is the host 16 view of paths to the I/O devices 26a, b, c as represented by subchannels 32a, b, c. The host 16 would execute channel commands to manage the operation of the I/O devices 26a, b, c. Each I/O device 26a, b, c may be a particular volume of a direct access storage device (DASD). The storage controller 18 controls access to the I/O devices 26a, b, c. As discussed, the storage controller 18 may include multiple logical subsystems (LSSs), i.e., control unit images, wherein each LSS may address up to 256 devices. In alternative embodiments, there may actually be multiple storage controllers providing communication with different I/O devices 26a, b, c. The channel subsystem 20, which may be a construct maintained in the main memory 30 of the host 16, includes subchannels 32a, b, c that execute operations for the channel subsystem 20. Channel paths 35 provide data communication between the host 16 and storage controller 18.

The host 16 maintains unit control blocks (UCB) that include device (volume) identification information and a device number. A device number relates a unit control block (UCB) to a single subchannel 32a, b, c. The host 16 processes the UCB to determine the subchannel 32a, b, c for the I/O device 26a, b, c associated with the UCB. During initialization, each I/O device 26a, b, c is associated with a subchannel 32a, b, c. The host 16 processes the information in the subchannel 32a, b, c to address an I/O operation to an I/O device 26a, b, c. In particular, the host 16 initiates an I/O operation toward an I/O device 26a, b, c by initiating a channel program which consists of a series of I/O instructions, such as a chain of CCW commands, on the subchannel 32a, b, c.

Each subchannel 32a, b, c further maintains a unit address corresponding to the device number which identifies the I/O device 26a, b, c to the storage controller 18. Thus, the subchannels 32a, b, c maintain device number and unit address information for the I/O device 26a, b, c associated with the subchannel 32a, b, c. For each base and alias address, a unit address, device number, subchannel, and UCB comprise a means for the host 16 to communicate with the I/O device 26a, b, c (volume). The UCB may also maintain status information on the associated I/O device 26a, b, c. The subchannel 32a, b, c is used to transmit the I/O operation to the storage controller 18 using the unit address associated with the selected subchannel 32a, b, c.

The storage controller 18 maintains a different view of the system. The storage controller 18 is provided a base unit address for each I/O device 26a, b, c (volume) and one or more alias unit addresses for each base unit address. As discussed, for each logical subsystem (LSS) within the storage controller 18, the 256 addresses for a LSS may be allocated in any manner between base and alias addresses. After assigning a base address to each I/O device, the remaining addresses can be allocated as alias addresses to the base addresses in any arrangement. The storage controller 18 uses the unit addresses to physically access the I/O devices 26a, b, c (volumes). In preferred embodiments, the structure of the storage controller 18 and interface between the storage controller 18 and host system 16 may be the storage controller 18 structure described in the following U.S. patent applications assigned to IBM: "Failover System for a Multiprocessor Storage Controller," to Brent C. Beardsley, Matt Kalos, Ronald R. Knowlden, Ser. No. 09/026,622, filed on Feb. 20, 1998; and "Failover and Failback System for a Direct Access Storage Device," to Brent C. Beardsley and Michael T. Benhase, Ser. No. 08/988,887, filed on Dec. 11, 1997, both of which applications are incorporated herein by reference in their entirety.

Base and Alias Addresses

Figure 3:
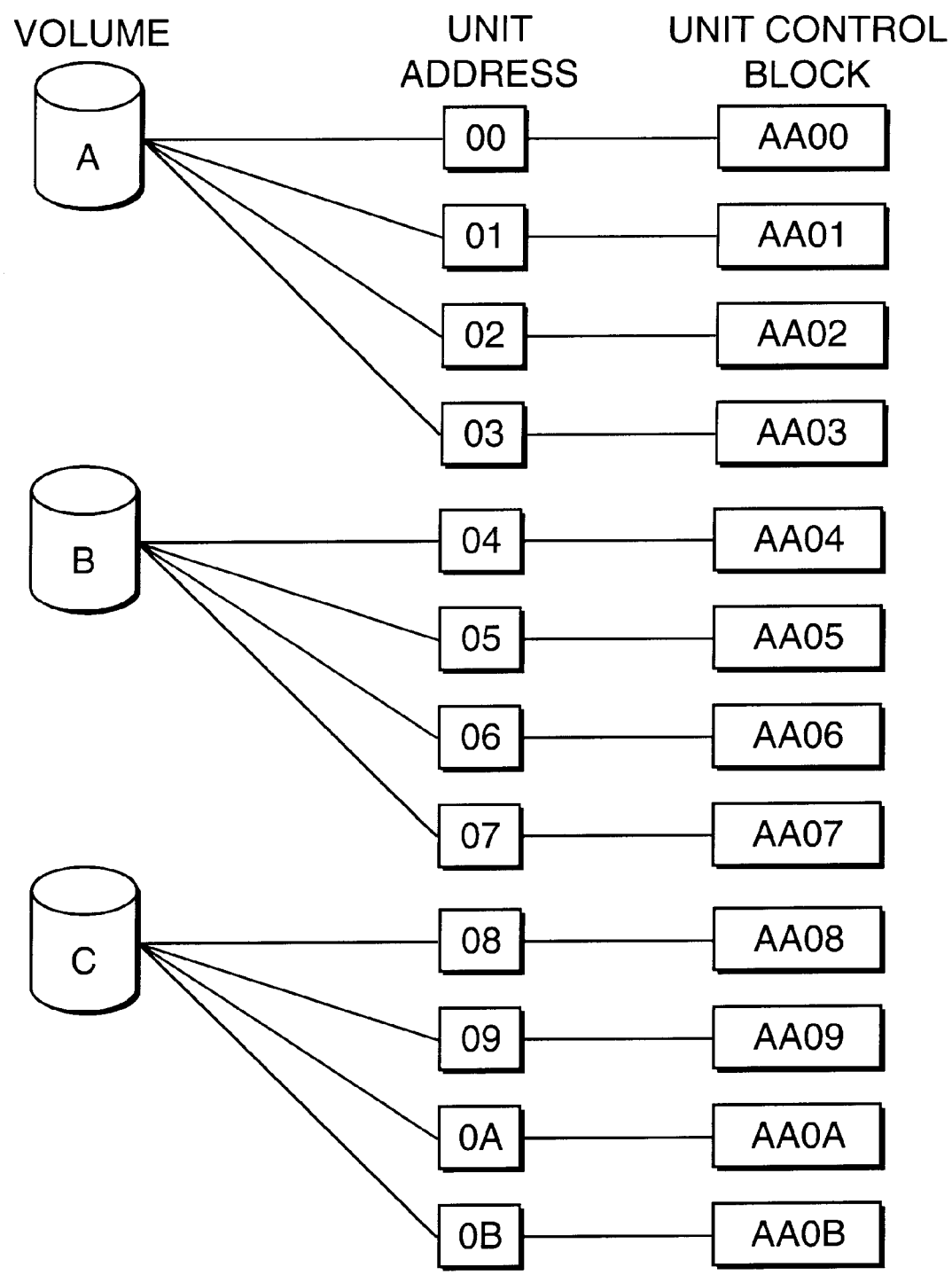
FIG. 3 illustrates how multiple addresses can relate to a single volume in accordance with preferred embodiments of the present invention.

FIG. 3 illustrates how a base and multiple alias addresses address an I/O device 26a, b, c in accordance with preferred embodiments of the present invention. In FIG. 3, the I/O device 26a, b is a volume in a storage device, such as a direct access storage device (DASD). For each base and alias address, there is a corresponding UCB and unit address. One of the unit addresses and UCBs is for the base address and the other three are the alias addresses. Each unit address and UCB corresponds to a single subchannel 32a, b, c which further relates to a plurality of channel paths 35 that link the channel subsystem 20 to the storage controller 18. A volume may be addressed with either the base or alias addresses associated with the volume. For instance, with reference to FIG. 3, volume A may be addressed using base unit address 00 and base UCB AA00, and alias unit addresses 01, 02, 03 and alias UCBs AA01, AA02, AA03. The main memory 30 includes a UCB for each alias address and base address assigned to a volume. The host 16, i.e., CPUs 24a, b, accesses the UCBs to determine the status of the I/O devices 26a, b, c. The UCBs in turn provide the subchannel 32a, b, c information, which further provides the unit address information needed for the I/O operation.

In preferred embodiments, every channel path 35 from the channel subsystem 20 provides a unique path to a volume (I/O device). An I/O operation or chain of CCW commands can be simultaneously executed toward the same volume using the different base and alias unit addresses for the volume. In this way, the executed CCW commands are all directed toward the same I/O device 26a, b, c using different addresses, wherein each address uses one of multiple channel paths 35 to reach a single volume or I/O device 26a, b, c. This allows a single host 16 to concurrently execute multiple I/O operations against a single volume. As discussed, alias addresses can be selectively allocated to base addresses that address particular I/O devices 26a, b, c as desired. The number of aliases provided for a base should be set according to the size of the volume and the number of concurrent users. In certain cases, only a few aliases may be needed to accommodate network traffic for a particular base address for an I/O device 26a, b, c.

The host 16 first attempts to access a volume (I/O device 26a, b, c) through the base UCB for the I/O device 26a, b, c. If the base UCB is unavailable, i.e., concurrently servicing another I/O operation, then the host 16 may use one of the available alias UCBs to concurrently access the I/O device 26a, b, c. The host system 16 then performs the I/O operations through the subchannel 32a, b, c associated with the UCB and the channel paths 35 provided for the subchannel 32a, b, c. When data is returned to the host system 16, the host system 16 can determine the I/O device 26a, b, c from which the return data came from the address. Thus, if multiple I/O operations are directed toward a single I/O device 26a, b, c concurrently along different subchannels using different UCBs, the host system 24a, b can handle multiple returns from the I/O operations because there are multiple UCBs associated with an I/O device 26a, b, c and, hence, multiple ways to associate the host 16 with an I/O device 26a, b, c. The host 16 may use multiple addresses to access the same volume as long as each channel program executed against one of the base or alias addresses does not try to update data used by another channel program accessing the same device.

Figure 4:
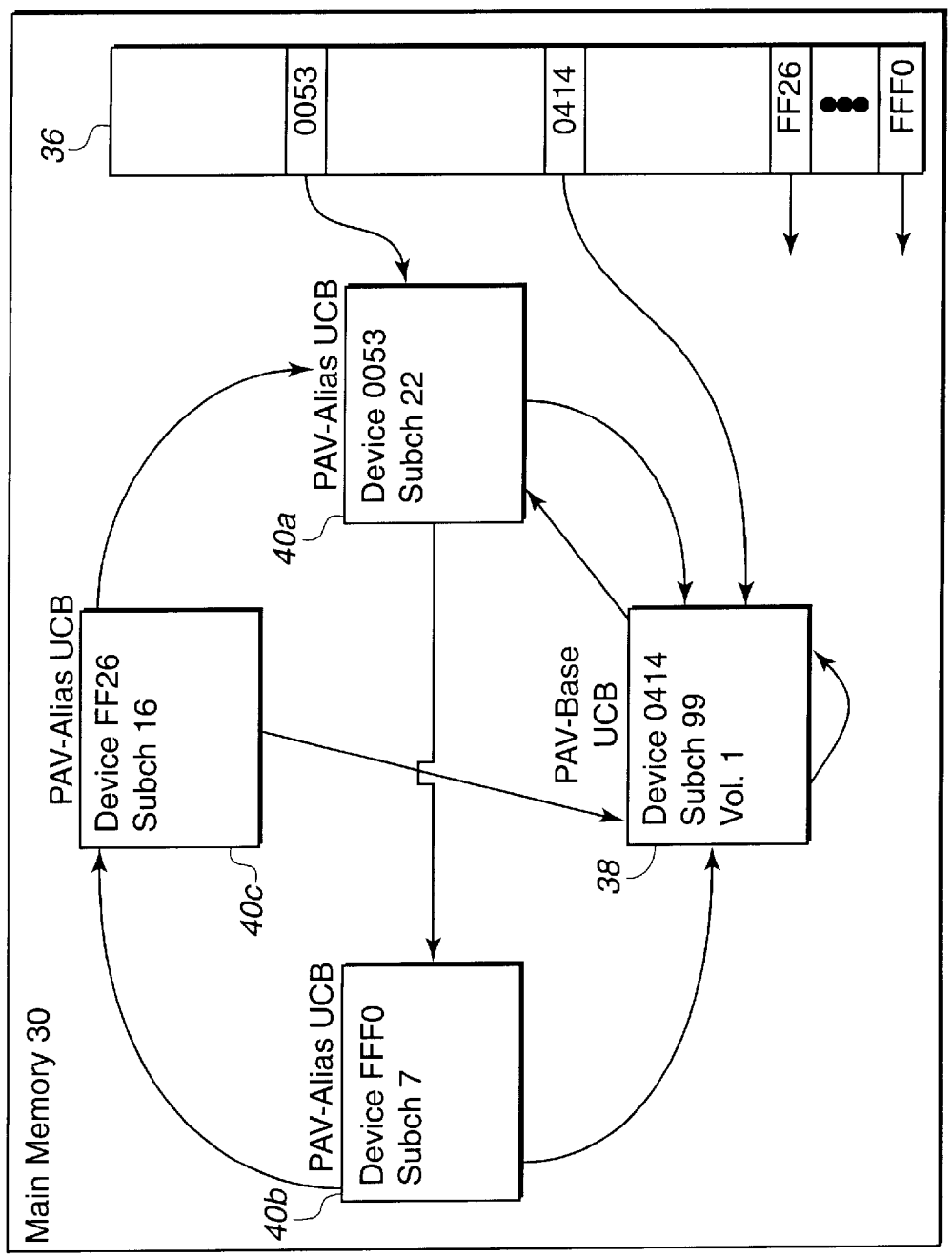
FIG. 4 illustrates data structures indicating base and alias addresses in accordance with preferred embodiments of the present invention.

FIG. 4 illustrates the relationship of a universal look-up table (ULUT) 36 containing the device numbers which relate to base and alias UCBs. In preferred embodiments, the ULUT 36 and UCB data structures 38, 40a, b, c are maintained in the main memory 30 of the host 16. The base 38 and alias UCBs 40a, b, c bound to the base 38 include pointers to address each other. A bound alias UCB indicates that during configuration, the host 16 formally associated, i.e., bound, the alias UCB to a base UCB. If an alias UCB has not been associated with a particular base UCB, then that alias is unbound. Only bound alias UCBs can be used to address a particular I/O device 26a, b, c in lieu of the base UCB 38. In preferred embodiments, the ULUT 36 may also include fields indicating whether a particular UCB identified by the device number in the ULUT is bound or unbound and a base or alias.

The alias UCBs 40a, b, c form a circular chain, referred to herein as the parallel access volume (PAV) circular queue. For instance, device number 0414 references a base UCB 38 and device numbers 0053, FFF0, FF26, each reference an alias UCB 40a, b, c, respectively. The base UCB 38 addresses the first alias UCB bound to that base. Each of the alias UCBs 40a, b, c include a pointer addressing the next alias UCB in the chain and a pointer back to the base UCB 38 to which the alias UCB 40a, b, c is bound. The last bound alias 40c further includes a pointer addressing the first bound alias UCB 40a. The first bound alias UCB 40a includes a pointer to the next bound alias UCB 40b. In this way, the alias and base UCBs 38, 40a, b, c form a chain, i.e., circular queue, of linked UCBs. As shown in FIG. 4, each UCB 38, 40a, b, c includes the subchannel number of the corresponding subchannel that provides address information for the I/O device 26a, b, c (volume) associated with the UCB. In FIG. 4, the base UCB identifies the actual volume, Vol. 1, to which the base refers. U.S. Pat. No. 5,530,897, entitled "System for Dynamic Association of a Variable Number of Device Addresses With Input/Output Devices to Allow Increased Concurrent Requests for Access to the Input/Output Devices," assigned to IBM and which patent is incorporated herein by reference in its entirety, includes further description of the information maintained in the UCBs.

The base UCB 38 of a bound alias UCB, e.g., alias UCB 40b, can be identified from the ULUT 36 and the PAV circular queue. First, the ULUT 36 is used to locate the alias UCB 40b. Then the base UCB 38 may be identified from the pointer in the alias UCB 40b that addresses the base UCB 38. To obtain an address for an I/O operation, the host 16 would first attempt to use the base UCB 38 for the target volume. If the base UCB 38 is involved in an I/O operation or otherwise unavailable, then the pointer in the base UCB 38 to the first alias UCB 40a would be used to determine whether the first alias UCB 40a was available. If so, the first alias UCB 40a would be used to provide an address and subchannel for the I/O operation. Otherwise, the first available alias UCB in the PAV circular queue would be used to provide an address for addressing the volume.

FIG. 5 illustrates a table 42 maintained in the channel subsystem 20 including information for each subchannel. Each subchannel 32a, b, c is identified by a unique 16 bit number starting from 0. Each subchannel 32a, b, c includes the device number assigned to the UCBs maintained in the ULUT 36 that correspond to the subchannel and a unit address identifying the I/O device 26a, b, c (volume) to the subchannel. As discussed, a subchannel 32a, b, c provides the logical appearance of a device to the host 16 and contains the information required for sustaining I/O operations against an I/O device 26a, b, c. Each subchannel 32a, b, c includes a subchannel information block (SCHIB) that includes the channel path identifiers (CHPIDS) of the channel paths 35 associated with the subchannel 32a, b, c. The CHPID is a system-unique eight-bit value assigned to each installed channel path 35 of the system through which the I/O devices 26a, b, c may be reached. Each CHPID 35 identifies a physical channel path. A subchannel 32a, b, c provides multiple channel paths, each identified by a CHPID, which the subchannel 32a, b, c may use to communicate with the I/O devices 26a, b, c. In this way, each subchannel 32a, b, is associated with one UCB through the device number and the unit address. Each subchannel 32a, b, c provides a mechanism to the host 16 for accessing and addressing the I/O device 26a, b, c over the channel paths 35 associated with the subchannel. In this way, multiple subchannels may be used to access the same volume by accessing multiple subchannels leading to the same volume.

For instance, upon selecting a base 38 or alias 40a, b, c address to use for an I/O operation, the host 16 would determine the corresponding channel subsystem 32a, b, c from the UCB of the selected base or alias address. Using the table in the channel subsystem 20 illustrated in FIG. 5, the host system 16 could then determine the unit address. For instance, if the host system 16 selected alias UCB 40b, the host 16 would process the alias UCB 40b to determine the subchannel 7 for the address. From the table in FIG. 5, the host 16 would determine the unit address 14 for subchannel 7.

When the host 16 executes an I/O operation on a subchannel 32a, b, c, the subchannel 32a, b, c provides the unit address of the target I/O device 26a, b, c. The channel subsystem 20, using the subchannel 32a, b, c information then transmits the I/O operation to the unit address associated with the subchannel 32a, b, c. The storage controller 18 then uses this unit address to execute the I/O operation.

Figure 6:
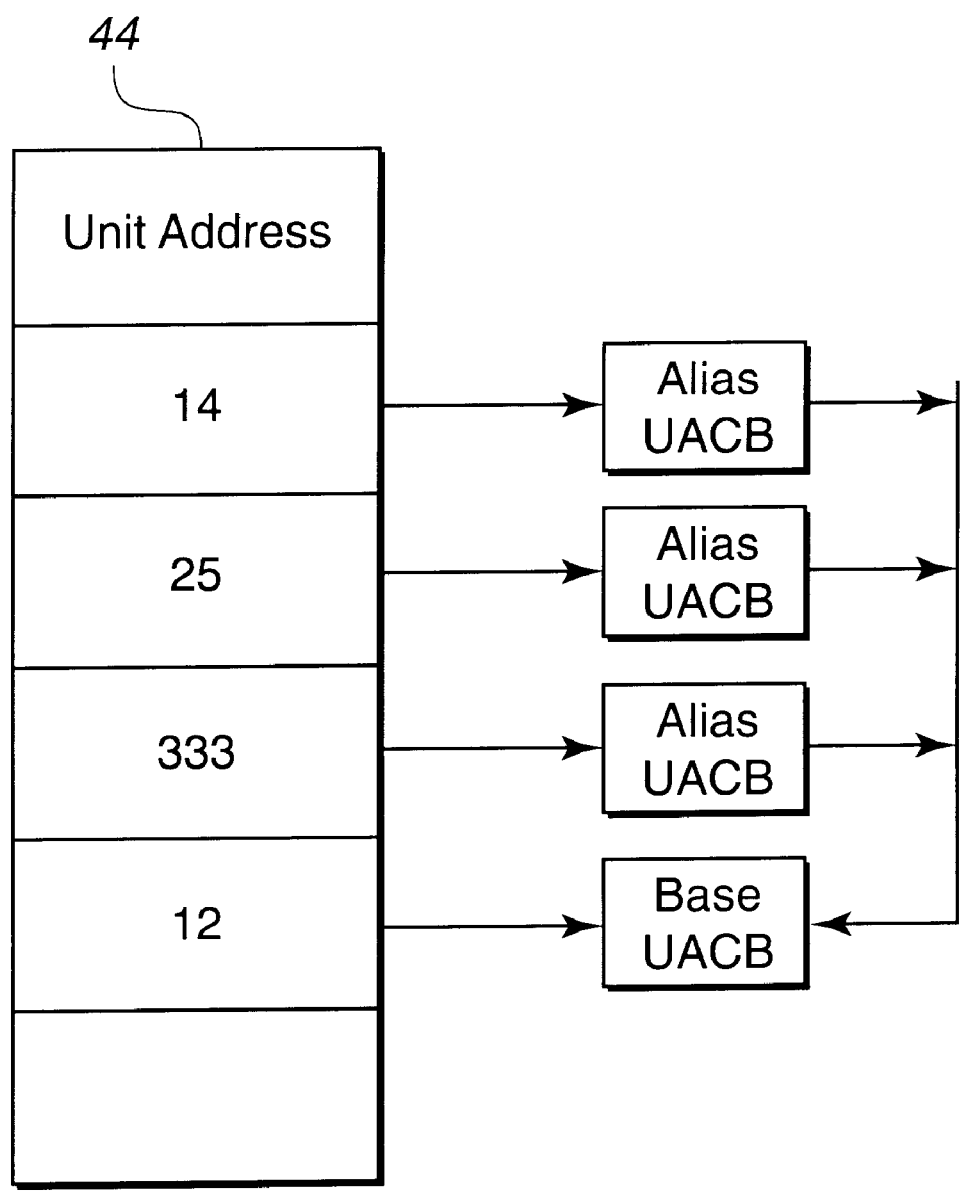
FIG. 6 illustrates information maintained by the storage controller associating base with alias addresses in accordance with preferred embodiments of the present invention.

The storage controller 18 maintains a control block for each unit address, otherwise referred to as a unit address control block (UACB). This UACB includes status information on the I/O device 26a, b, c the unit address addresses. FIG. 6 illustrates a table 44 of unit addresses 14, 25, 333, 12 which point to the corresponding UACB for the unit address. The UACB identifies itself as a base or alias. The alias UACBs include a pointer to the base UACB for that alias. The storage controller 18 can determine the base unit address from the alias unit address by looking up the alias unit address in the table 44, locating the alias UACB from the pointer, and then determining the base UACB from the pointer in the alias UACB. The storage controller 18 would process the base UACB to determine the base unit address for the alias unit address that is the target of the I/O operation.

The storage controller 8 executes a task or I/O operation comprised of a chain of CCW commands by allocating a task control block including control information for an I/O operation, e.g., chain of CCW commands, and queuing the task control block against a base UACB. In this way, a multitude of tasks represented by task control blocks can be queued against a single volume (I/O device 26a, b, c). The task control block includes information needed to execute the chain of commands, such as the unit address, base or alias, that is the target of the task, and any other control information needed to complete the task and return the data to the host system 4.

If the I/O operation is directed toward an alias unit address, the storage controller 18 processes the alias UACB to determine the base unit address from the pointer in the alias UACB to the base UACB. The storage controller 18 then queues the I/O operation, i.e., task control block, against the located base unit address identified in the base UACB. The storage controller 18 queues multiple I/Os against the same base address. If there are multiple paths to the I/O device 26a, b, c (volume) identified by the base unit address, then the storage controller 18 may execute multiple I/O operations in parallel on the multiple paths. Although the storage controller 18 executes the I/O operation against the base unit address, when an I/O operation requires an attention or return message, the storage controller 18 uses the initial alias unit address associated with the I/O operation when returning a message or data to the host system 16.

The host 16 may issue a reserve command to reserve an I/O device 26a, b to prevent other hosts from accessing the I/O device 26a, b, c (volume). The reserve command provides a host exclusive access to a volume. For instance, to allocate a data set, the host system 16 could issue a command to reserve the volume including the data set, read a volume table of contents (VTOC) to determine if the volume the host wants to reserve is available, update the VTOC, and release the volume. Once reserved, no other host can access the volume until the reserving host releases the volume by writing a release to the VTOC. Once reserved, only the reserving host can issue I/O against. When a volume is reserved, the storage controller 18 would reserve all base and alias unit addresses addressing the reserved I/O device 26a, b, c. In preferred embodiments, a host may only issue a reserve command against the base address. No other host can access the volume or I/O device 26a, b, c until the reserving host writes to the VTOC to indicate that the volume is available.

In preferred embodiments, the host 16 and storage controller 18 maintain separate views of the system. For instance, the storage controller 18 has no knowledge of the channel subsystem 20, subchannels 32a, b, UCBs, etc., which are part of the host 16 view.

Configuration Data Records

The host 16 obtains information on the arrangement of the PAV devices by issuing a Read Configuration Data (RCD) command to an I/O device 26a, b, c. In response, the storage controller 18 provides Configuration Data Records (CDR) indicating the addressing, status, and control information for the device. In preferred embodiments, there is one CDR per channel path to an I/O device 26a, b. A CDR includes a variable number of 32 byte fields called node-element descriptors (NED). A node element is any identifiable entity in the system, e.g., volume, RAID Rank, cluster, subsystem, etc. The NED contains data that uniquely describes the node element. The CDR further includes a token NED which identifies the CDRs associated with a logical subsystem (LSS). All the CDRs for a particular LSS, i.e., control unit image, have the same token NED. A storage cluster is a power and service region that runs channel commands and controls the storage devices. Each storage cluster contains both channel and device interfaces. Storage clusters also perform the DASD controller functions.

The main memory 30 includes a configuration data table (CDT) which is comprised of the CDRs for each subchannel 32a, b, c. The host 16 may access this table to access CDR records. Table 1 below shows a preferred embodiment of the fields included in the CDR data structure for an alias UCB in accordance with preferred embodiments of the present invention. The Node Element Qualifier (NEQ) describes the paths and addressees for a particular device, controller, volume, etc. A further description of the NED and NEQ fields are described in IBM document "Storage Subsystem Library: IBM 3990 Storage Control Reference (Models 1, 2, and 3)", IBM document no. GA32-0099-06, (IBM Copyright 1988, 1994) and U.S. Pat. No. 5,191,069, assigned to IBM, which publication and patent are incorporated herein by reference in their entirety.

TABLE 1

| FIELD | DESCRIPTION |
|---|---|
| 1 | Node Element Descriptor (NED)of the Volume |
| 2 | Node Element Qualifier (NEQ) for the Volume NED. |
| 3 | NED 2, which describes the RAID rank information for the volume. |
| 4 | NED 3 contains the NED for the cluster that the system adaptor resides in. |
| 5 | NED 4 describes the physical subsystem |
| 6 | NEQ, that describes the paths and addresses |

Table 2 below describes fields included in the NEQ field in the CDR when the system supports PAV base and alias addresses in accordance with preferred embodiments of the present invention.

TABLE 2

| FIELD | DESCRIPTION |
| --- | --- |
| 1 | Flags |
| 2 | Unit Address Flags for the DASD, indicating whether unit address is base address or alias address |
| 3 | Alias Address Parameters. When the unit address is an Alias address, as indicated in Field 2, this field contains the base unit address to which the alias address is bound. |

The NEQ indicates the unit address associated with the device number and subchannel and whether the unit address associated with the CDR is a base or alias. When the unit address is an alias, the third field of the NEQ indicates the base unit address of the I/O device 26a, b, c associated with the alias. The CDT further maintains a subsystem control block (SSCB) which identifies the channel subsystem 20. All CDRs are grouped according to the SSCB. Each UCB addresses the SSCB containing the paths to the I/O device 26a, b, c represented by the UCB.

Table 3 below illustrates the CDR record generated for base addresses and single access volumes (SAVs) which do not have alias addressing capabilities.

TABLE 3

| FIELD | DESCRIPTION |
| --- | --- |
| 1 | Node Element Descriptor (NED) of the Volume |
| 2 | NED 2, which describes the RAID rank information for the volume. |
| 3 | NED 3 contains the NED for the cluster that the system adaptor resides in. |
| 4 | NED 4 contains the token NED for the subsystem. |
| 6 | NEQ, that describes the paths and addresses |

During initialization, the host 16 issues the RCD commands to obtain the CDR data from the storage controller 18 for each subchannel 32a, b, c. The host 16 furthers issues a set system characteristics command to the storage controller 18 to inform the storage controller 8 of the host 16 capabilities, including whether the host 16 supports PAV.

Initialization

In preferred embodiments, a systems programmer may encode in the storage controller 18 the structure of the system, including the I/O devices 26a, b, c (volumes), logical subsystem (LSS) information, the base addresses, the alias addresses, the number of channel paths 35 between the storage controller 18 and the channel subsystem 20, the subchannels 32a, b, c, the device numbers, the unit addresses, etc. As discussed, the device number identifies a subchannel 32a, b, c and corresponding I/O device 26a, b, c to the host 16 and the unit address identifies the I/O device 26a, b, c to the storage controller 18. In preferred embodiments, the systems programmer defines the base and alias addresses independently, i.e., the systems programmer does not specify the relationship of aliases to bases. Thus, no binding of base and aliases is implied by the user defined parameters.

FIGS. 7–16 illustrate preferred logic implemented in the host 16 and channel subsystem 20 to initialize the system and bind and assign alias addresses to base addresses to provide multiple access paths to a single volume. This logic may be implemented in a ROM or software accessible to the host 16 and/or channel subsystem 20.

Figure 7:
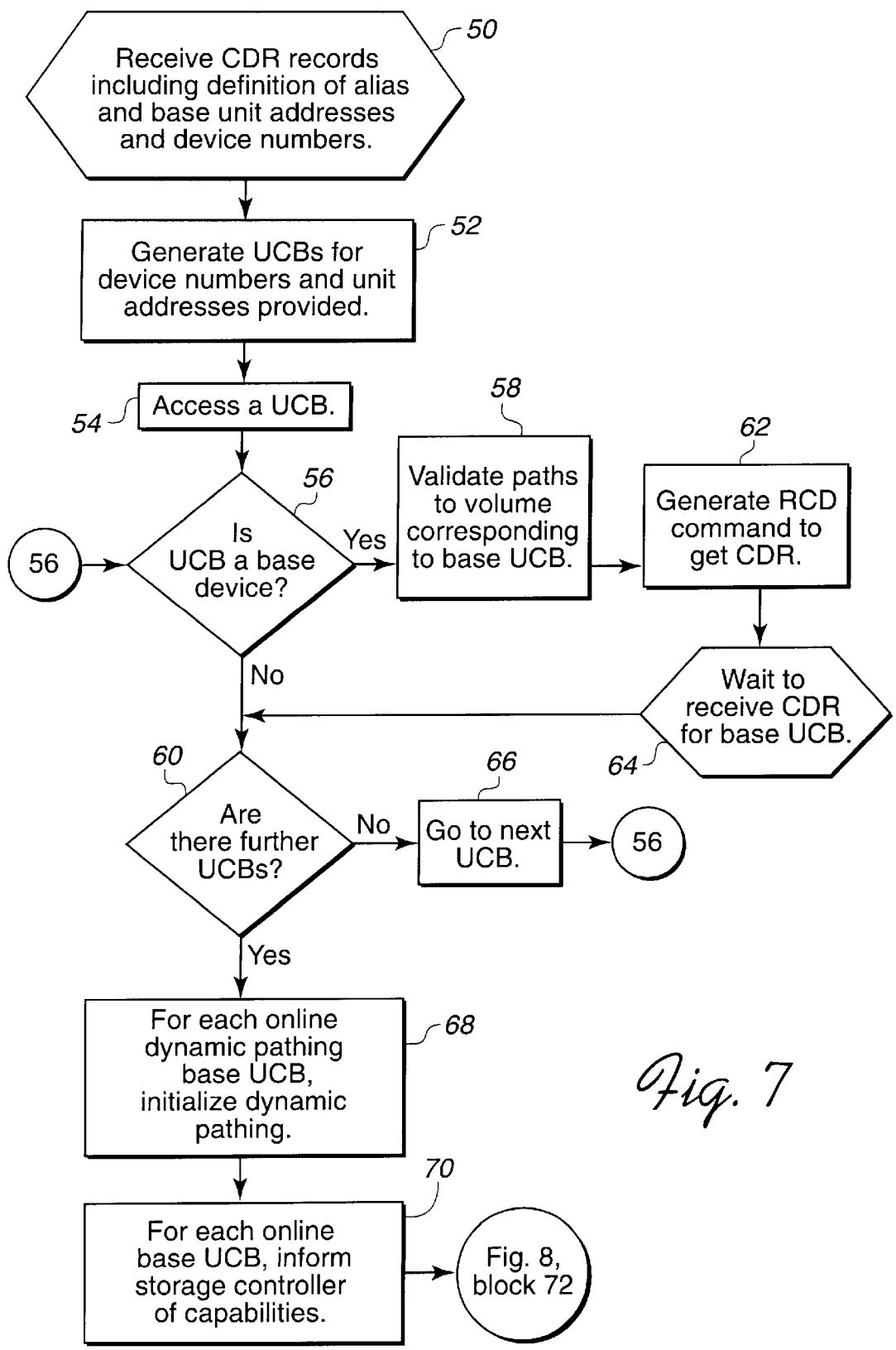
FIGS. 7 and 8 illustrate steps to initialize the system in accordance with preferred embodiments of the present invention.

With respect to FIG. 7, control begins at block 50 which represents the host system 16 receiving CDR records indicating base and alias device numbers, unit addresses, control units, channel paths, etc., defined by the systems programmer at the storage controller 18 level. Control then transfers to block 52 which represents the host 16 generating UCBs based on the device numbers, unit addresses, and other system information provided by the operator. At generating time, the UCB base and aliases are not bound. When generated, the UCBs are defined as parallel access volumes (PAVs), which are volumes that can be concurrently accessed via multiple addresses or subchannels, or as single access volumes (SAVs), which are volumes that can be accessed through only one address or subchannel.

Control then transfers to block 54 which represents the host 16 accessing the first UCB. Control transfers to block 56 which is a decision block representing the host 16 determining whether the UCB is for a base address. If so, control transfers to block 58; otherwise, control transfers to block 60. Block 58 represents the host system 16 validating paths to the volume (I/O device 26a, b, c) corresponding to the base UCB. The host system 16 may validate paths by issuing a command to a channel path 35 to associate the channel path 35 with all other channel paths 35 with the same ID. This ID associates channel paths with a volume. The channel subsystem 20 communicates with the volume through the channel paths 35 having the ID. The subchannels 32a, b, c maintain information on the paths that connect to the volume (I/O device 26a, b, c). From block 58, control transfers to block 62 which represents the host 16 generating a read configuration data (RCD) command to obtain the CDR record for the base UCB described in Table 3. Control then transfers to block 64 which represents the host system 16 waiting to receive the CDR for the base UCB.

From blocks 56 and 64, control transfers to block 60 which represents the host system 16 determining whether there are any further UCBs not considered for validation. If there are further UCBs, control transfers to block 66 to access the next UCB and then back to block 56. If there are no further UCBs to consider, control transfers to block 68 which represents the host system 16 looping through all online UCBs that are capable of dynamic pathing and initializing the dynamic pathing for the located base UCBs. As discussed, in prior art systems, dynamic pathing is used to provide alternative paths in a path group to reconnect by an I/O device in the event that the connection was lost. Only I/O devices 26a, b, c (volumes) for which dynamic pathing is available can be PAVs because dynamic pathing by definition means that there are multiple channel paths 35 to a single I/O device 26a, b, c. Initializing the dynamic paths requires sending a command down each dynamic channel path to verify and determine the status of the dynamic paths.

Control transfers to block 70, which represents the host system 16 reinvoking path validation for each online I/O device 26a, b, c to verify the status of the I/O device 26a, b, c. The host 16 then performs an exit to generate a Set Subsystems Characteristics command issued to the I/O devices 26a, b, c. This Set Subsystems Characteristics command informs the storage controller 18 that the host system 16 is PAV capable. After receiving indication that the host system 16 is PAV capable, the storage controller 18 then allows the host system 16 to address the I/O devices 26a, b, c on the alias addresses. In response to the Set Subsystems Characteristics command, the storage controller 18 further indicates in the device self-description data that the I/O device 26a, b, c is PAV capable. In preferred embodiments, this Set Subsystems Characteristics command may only be received on a channel that has received a valid Set Path Group Identifier command providing a valid path group ID for the channel. With this command, the host system 16 indicates recognition of the volume corresponding to the particular UCB as a PAV. The storage controller 18 will, thus, know that the host 16 is parallel access ready for that volume after receiving Set Subsystems Characteristics command indicating PAV capability. This communication enables PAV operations. If the storage controller 18 is not notified via the Set Subsystems Characteristics command that the host system 16 is PAV capable, then the storage controller 18 treats the unit address as a SAV and would not transmit CDR information tailored for a PAV device. Further details of the Set Subsystems Characteristic command are described in related patent application "Defining Characteristics Between Processing Systems," U.S. application Ser. No. 09/167,605, which patent application was incorporated by reference above.

Figure 8:
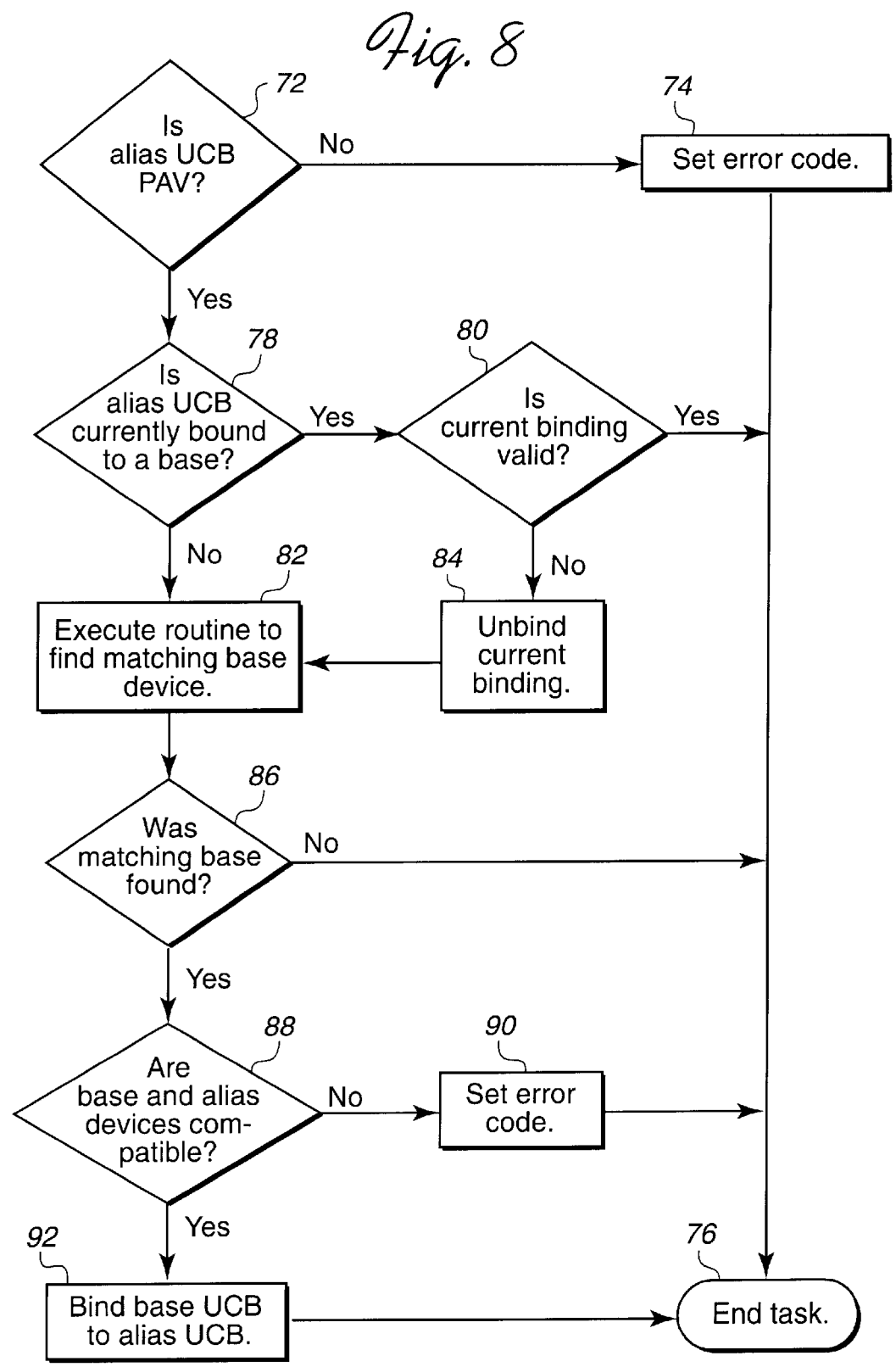

Control then transfers to block 72 in FIG. 8 to begin the binding process on the alias UCBs for the initialized base UCBs. With respect to FIG. 8, at block 72, the host 16 determines whether the alias UCB is a PAV or SAV. If the alias UCB is not a PAV, then control transfers to block 74 to set an error code and end the binding process for that particular alias UCB at block 76. After ending the binding process for a particular alias UCB, the host 16 would loop back through the logic beginning at block 72 until all alias UCBs were considered. If the considered alias is a PAV, then control transfers to block 78 to determine whether the alias UCB is currently bound to a base UCB. If so, control transfers to block 80 to verify whether the current binding is valid. If the current binding is valid, then control transfers to block 76 to end binding for the particular alias UCB. If the current binding is invalid, control transfers to block 84 to unbind the alias UCB.

When an alias UCB is in an unbound state at blocks 78 or 84, then control transfers to block 82 to execute a routine to locate the matching base UCB. Control transfers to block 86 which represents the host 16 determining whether the base and alias devices are compatible, i.e., whether the channel paths 35 and the storage controller 18 providing access to the I/O device 26a, b, c are configured the same. If not, control transfers to block 90 to set an error code and then to block 76 to end the program. If the base and alias UCBs are compatible, then control transfers to block 92 to bind the particular alias UCB to the located base UCB, thereby binding the alias and base addresses corresponding to the UCBs. In preferred embodiments, a binding is maintained throughout multiple I/O operations until the systems programmer alters the assignment of alias to base addresses.

Figure 9:
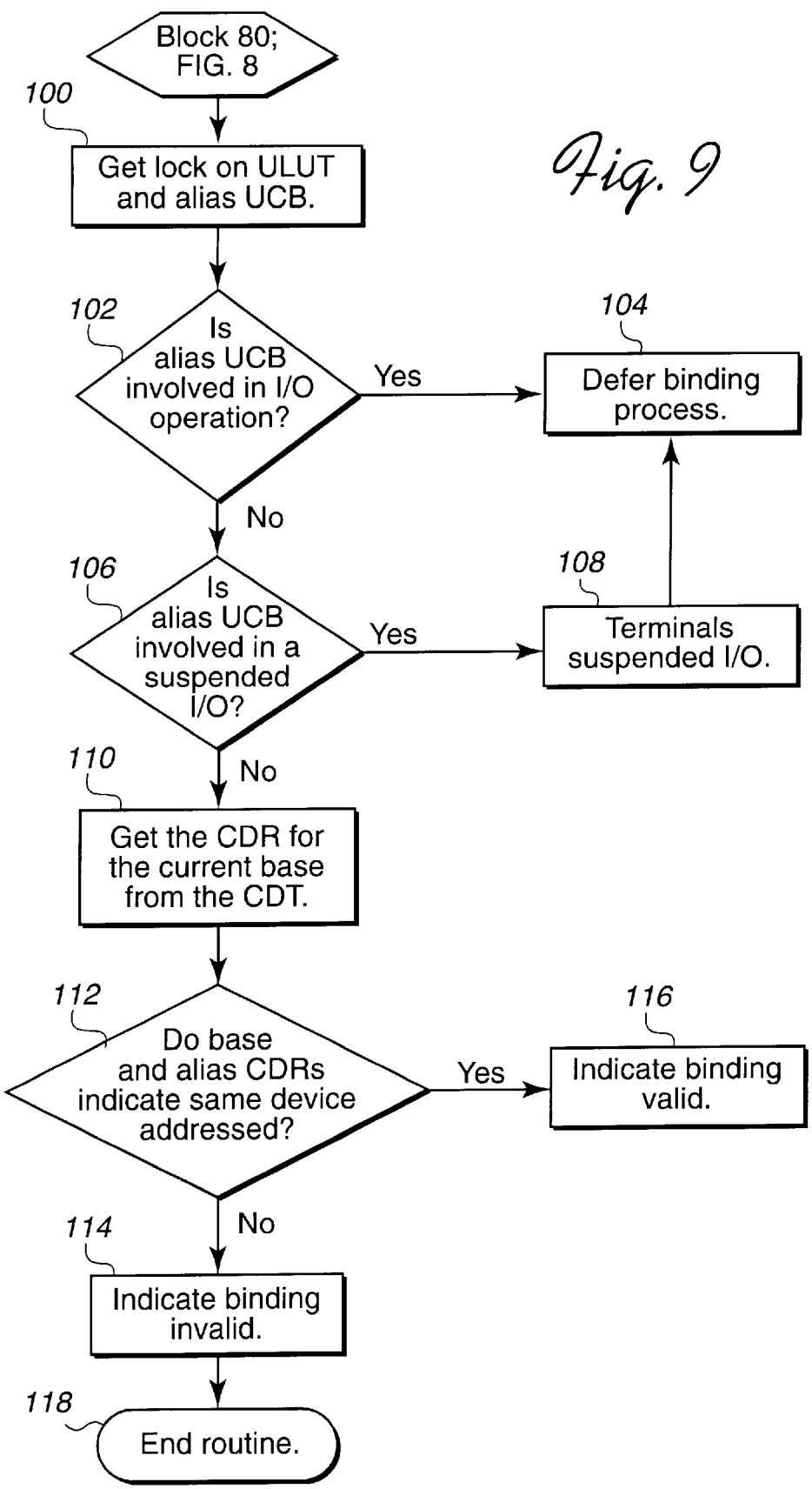
FIG. 9 illustrates logic to determine whether the current binding of an alias to base address is valid in accordance with preferred embodiments of the present invention.

FIG. 9 illustrates logic implemented in the host initialization software to verify the validity of the current binding at block 80 in FIG. 6. With respect to FIG. 9, control begins at block 100 which represents the host 16 obtaining a lock on the ULUT 36 including the UCBs and the alias UCB subject to the binding logic of FIG. 6 to prevent any accesses of the alias UCB and base UCB involved in the binding process. Control transfers to block 102 which represents the host 16 processing the alias UCB to determine whether an I/O operation is currently directed toward the I/O device 26a, b, c corresponding to the alias UCB. If so, control transfers to block 104 to defer the binding process to complete all ongoing I/O operations. Otherwise, if the alias UCB is not involved in an I/O operation, control proceeds to block 106 which represents the host 16 determining whether the alias UCB is involved in a suspended I/O operation. If so, control transfers to block 108 to terminate the suspended I/O operation and to block 104 to defer the binding process. If the alias UCB is not involved in a pending or suspended I/O operation, then control transfers to block 110 which represents the host 16 obtaining the CDR for the base UCB to which the alias UCB is currently bound. As discussed below, the alias UCB includes a pointer to the base UCB to which it is bound.

The host 16 may obtain the CDR for the base UCB from the CDT table of UCBs built from issuing the RCD commands. Control then transfers to block 112, which represents the host 16 determining whether the base and alias CDRs indicate that the alias and base addresses address the same device. The host 16 may determine whether the same device is addressed by comparing the NED data and token NEDs in the base and alias CDRs. Other fields in the CDRs may also be compared. If the same device is addressed, then the binding is valid and control transfers to block 116 to indicate that the binding is valid. If the same device is not addressed as indicated from the CDRs, then the current binding is invalid, and control transfers to block 114 to indicate that the binding is invalid. If the binding is invalid, then the host 16 would call the unbind routine at block 84 in FIG. 8.

Figure 10:
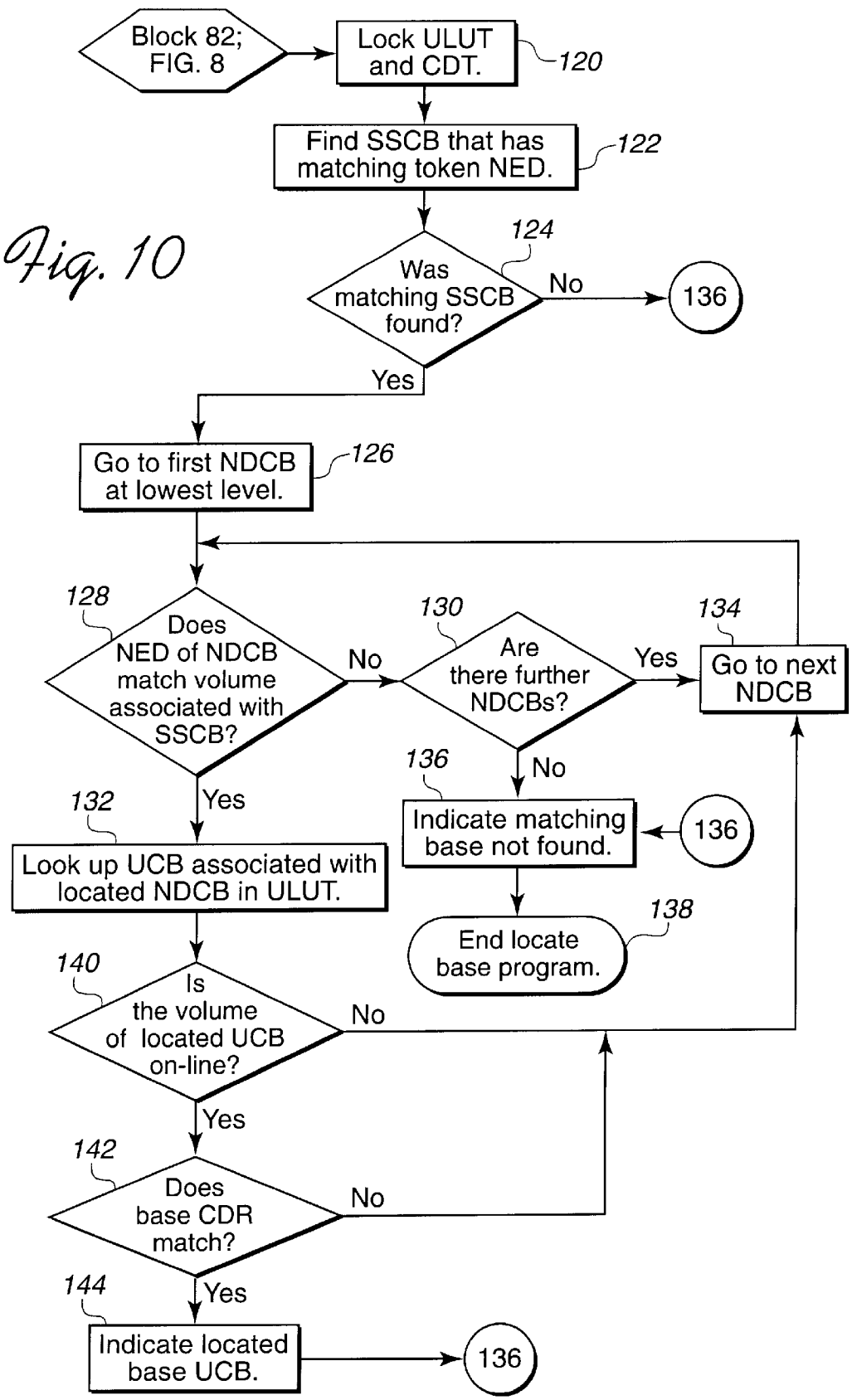
FIG. 10. illustrates logic to locate a base UCB corresponding to an alias UCB in accordance with preferred embodiments of the present invention.

FIG. 10 illustrates logic implemented in the host 16 to perform the step at block 82 in FIG. 8 to locate the base UCB for the alias UCB if the alias UCB is not currently bound. Control begins at block 120 which represents the host 16 obtaining a lock for the ULUT 36 and the CDT to prevent searching of the UCBs. Control transfers to block 122 to find the subsystem control block (SSCB), which identifies the subsystem, that matches the token NED of the alias UCB. As discussed, the token NED associates all CDRs with a particular subsystem. In preferred embodiments, the SSCBs are included in the CDT, and each SSCB includes a token NED, which is compared to the token NED of the alias UCB. Control transfers to block 124 which represents the host 16 determining whether a matching SSCB was located. The base UCB for the alias must be in the subsystem identified by the matching SSCB. If not, control transfers to block 136 which represents the host 16 indicating that a matching base was not found and then proceeding to block 138 to terminate the locate base program.

Figure 11:
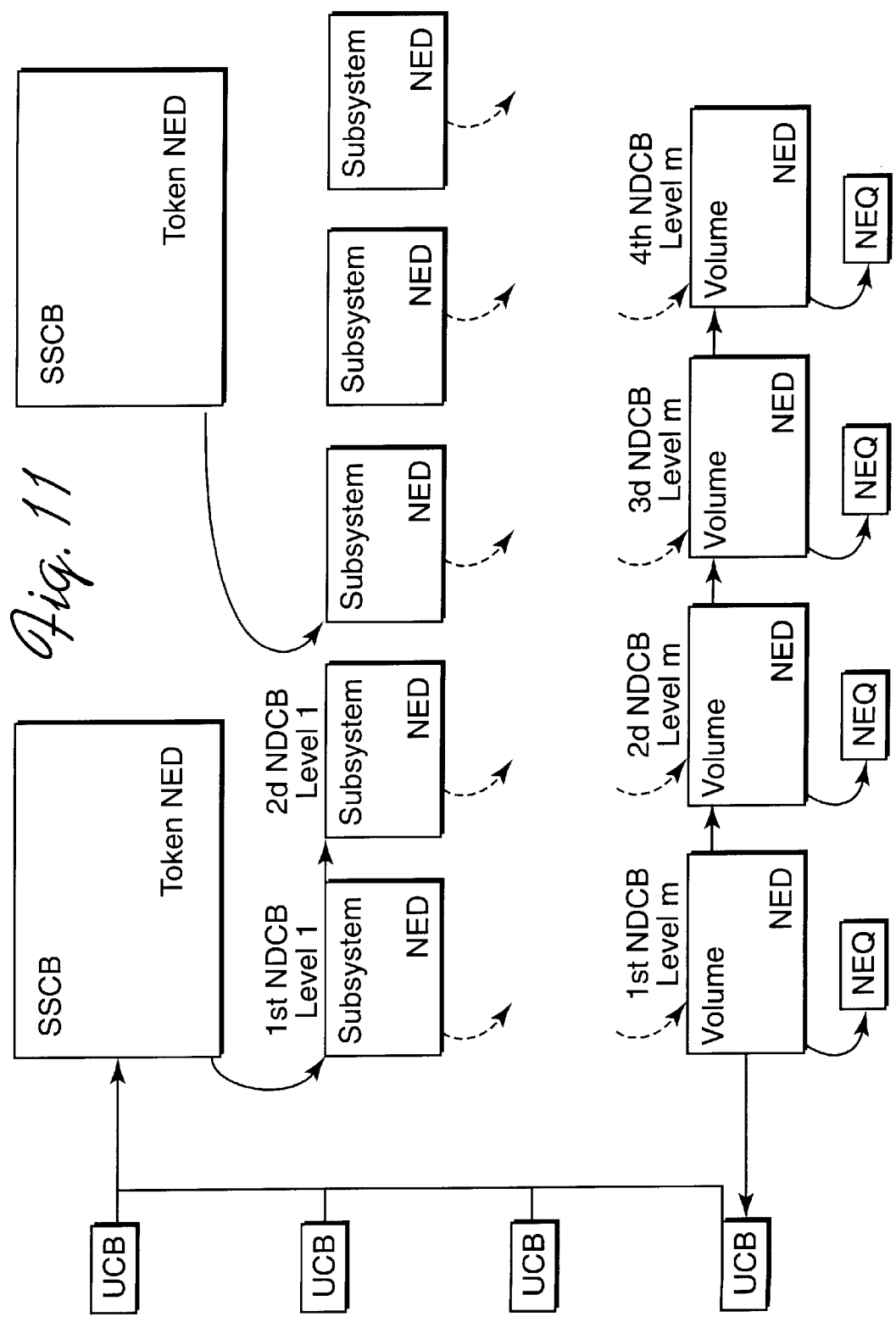
FIG. 11 illustrates a grouping of CDR records in accordance with preferred embodiments of the present invention.

FIG. 11 illustrates a data structure of the SSCBs which point to NED control blocks (NDCBs). The NDCB is a data structure in which the NEDs in a CDR are stored in a hierarchical relationship. FIG. 11 illustrates the subsystem NED at the highest level, level 1, and the NEQ at the lowest level. The device or volume level is level m. There may be other levels in between, such as RAID, etc. The NDCB structures provide a linked list stringing together the NED records from different CDRs in a hierarchical relationship. The NEDs from a CDR are maintained in a tree. Thus, the SSCB provides a pointer to a data structure linking the NEDs from all CDRs associated with a storage controller 18 therein associated with the SSCB.

After locating a matching SSCB at block 124, control transfers to block 126 which represents the host 16 proceeding to the first level m NDCB which includes the NED for the volume (I/O device 26a, b, c). In preferred embodiments, the linked NEDs in the NDCB data structure comprise the Control Data Table (CDT). Control then transfers to block 128 which represents the host 16 determining whether the NED of the subject NDCB matches the NED of the alias. If so, control transfers to block 130; otherwise, control transfers to block 132 which represents the host 16 determining whether there are further NDCBs. If there are further NDCBs in the linked list, control transfers to block 134 to proceed to the next NDCB in the linked list and back to block 128. If there are no further NDCBs and the base UCB has not been located, then control transfers to block 136 to indicate that a matching base UCB was not found and terminate the locate program at block 138.

If a match occurs, then control transfers to block 132 which represents the host 16 looking up the UCB corresponding to the matching NDCB in the ULUT 36. As shown in FIG. 11, the NDCBs include a pointer to associated UCBs. The first associated UCB would be the base UCB. In alternative embodiments, the host 16 may reconstruct the CDR from the located NDCB and then determine the UCB from the reconstructed CDR. This process of constructing the CDR from the NDCB is described in U.S. Pat. No. 5,197,069, entitled "Method and System for Detecting and Recovering from Switching Errors, assigned to IBM, which patent is incorporated herein by reference in its entirety. After determining a base UCB, control transfers to block 140 which represents the host 16 determining whether the I/O device 26a, b, c corresponding to the located base UCB is on-line. If so, control then transfers to block 142; otherwise, control transfers to block 134 to attempt to determine an on-line base UCB from further NDCBs. If a search of the NDCB list does not locate an NED with a matching volume, then the I/O device 26a, b, c (volume) corresponding to the base UCB is off-line and the alias left unbound. Block 142 represents the host 16 determining whether data in the CDR of the located base UCB matches that of the alias UCB. This match may be performed by comparing the NED data in the base and alias CDRs. Upon determining a match, control transfers to block 144 to indicate that the base UCB was located. Otherwise, control transfers back to block 134 to continue searching the NDCBs to locate an base UCB associated with an online device. If a base not located, then the I/O device 26a, b, c represented by the base UCB is likely off-line. The indication made with the logic of FIG. 10 is used at block 86 in FIG. 6 to determine the next step based on whether the base UCB was located.

Figure 12:
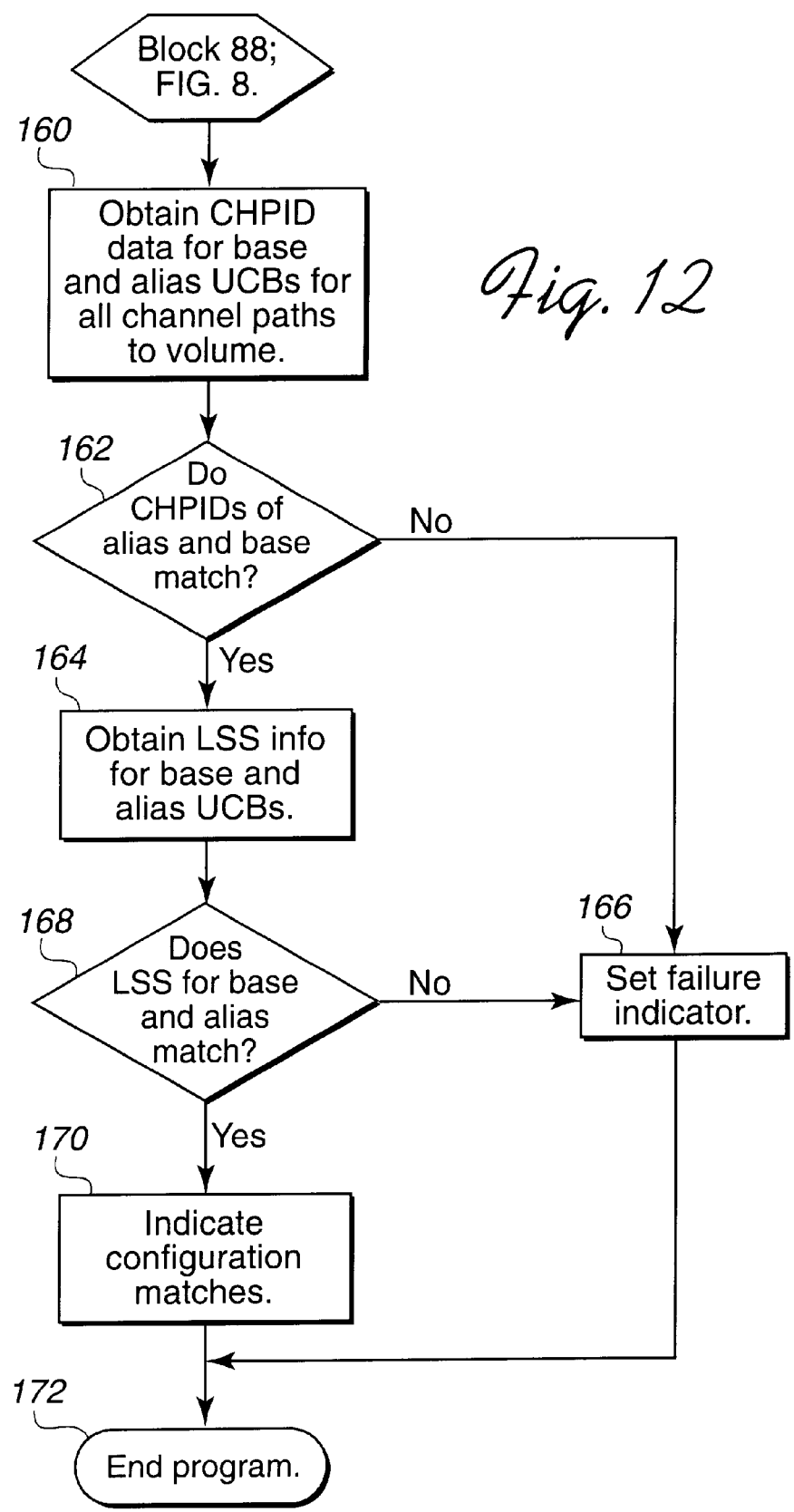
FIG. 12 illustrates logic to determine whether the configuration of an alias UCB and base UCB matches in accordance with preferred embodiments of the present invention.

FIG. 12 illustrates logic for step 88 in FIG. 8 to determine whether the I/O devices 26a, b, c (volumes) corresponding to the located base UCB and the alias UCB are compatible. A compatibility determination involves consideration of whether the base and alias UCBs use the same channel paths to access the same I/O device 26a, b, c (volume). Control begins at block 160 which represents the host 16 obtaining the CHPID data for the base and alias UCBs. As discussed, the CHPID is a unique identifier for each channel path 35 connecting the channel subsystem 20 to the storage controller 18. Each subchannel 32a, b, c may include multiple channel paths 35 to a single I/O device 26a, b, c and, hence, include information on all the CHPIDs for the channel paths linking the subchannel 32a, b, c to the I/O device 26a, b, c. The host 16 may obtain such information by issuing a command to the channel subsystem 20 requesting CHPID data or, alternatively, such CHPID data may be maintained in the UCB or other table managed by the host 16. Control then transfers to block 162 which represents the host 16 determining whether the CHPIDs for the base and alias match. If so, control transfers to block 164; otherwise, control transfers to block 166 to set a failure indicator indicating that the base and alias UCB configuration do not match.

If there is a match, control transfers to block 164 which represents the host 16 obtaining data on the logical subsystem (LSS) arrangement of the storage controller 18. The host 16 may obtain such information by issuing a command to the channel subsystem 20 requesting LSS information or, alternatively, such LSS information may be maintained in the CDR, UCB or other table managed by the host 16. Control then transfers to block 168 which represents the host 16 determining whether the storage controller 18 configuration for the alias and base UCBs match. If so, control transfers to block 170 which represents the host 16 indicating that the configuration matches. Control then transfers to block 172 to end the program verifying the alias and base device compatibility. If the LSS information did not match, then control would transfer to block 166 to set the failure indicator. From block 170 and 166, control transfers to block 172 to end the compatibility determination program.

Figure 13:
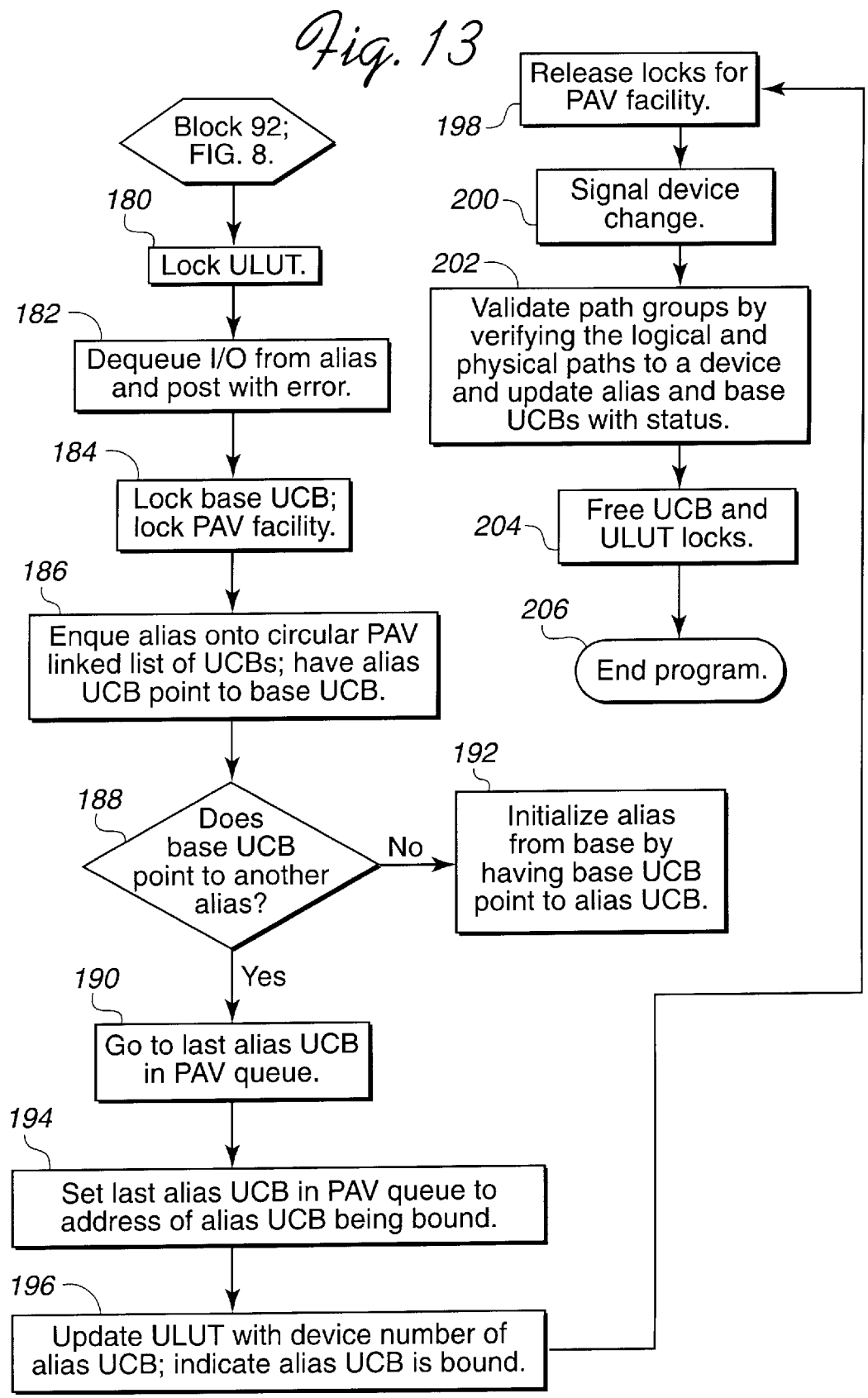
FIG. 13 illustrates logic to bind an alias address to a base address in accordance with preferred embodiments of the present invention.

FIG. 13 illustrates logic implemented in the host 16 to bind the verified alias and base UCBs, which is step 92 in FIG. 8. From block 92, control transfers to block 180 in FIG. 13 which represents the host 16 locking the ULUT 36 to prevent access to the ULUT 36 while it is being updated with the new bound alias. Control transfers to block 182 which represents the host 16, dequeueing I/O requests toward the alias UCB and posting an error to any such requests to retry later when the alias UCB is bound. Control transfers to block 184 which represents the host 16 locking the base UCB and the PAV facility to block any parallel access requests. Control transfers to block 186 which represents the host 16 enqueueing the alias UCB in the PAV circular chain illustrated in FIG. 4 so that the alias UCB is in the chain of alias UCBs associated with the base. In preferred embodiments, the host 16 would enqueue the alias UCB by having the alias UCB address the base UCB. Control transfers to block 188 which represents the host 16 determining whether the base UCB points to (addresses) another alias UCB. If not, control transfers to block 192 which represents the host 16 initializing the alias UCB from the base UCB by having the base UCB point to the alias UCB.

If there are multiple alias UCBs in the PAV circular queue, then control transfers to block 190 which represents the host 16 determining the last alias UCB in the circular PAV queue. The host 16 may make such a determination by processing a counter indicating the number of alias UCBs for the base UCB. The host 16 would then go from alias UCB to alias UCB using the pointers included with the base and alias UCBs to reach the last alias UCB in the chain indicated by the counter value. Other methods for determining the last alias UCB could also be used. After determining the last alias UCB in the PAV circular queue, control transfers to block 194 which represents the host 16 setting the pointer in the last alias UCB in the queue to address the alias UCB to be bound. Control then transfers to block 196 which represents the host 16 updating the device number entry in the ULUT 36 for the bounded alias UCB to indicate that the alias UCB is bound.

Control then transfers to block 198 which represents the host 16 releasing the locks for the PAV facility. The host 16 then, at block 200, signals a change in status for the I/O device 26a, b, c (volume) to which the alias UCB was bound. Control then transfers to block 202 which represents the host 16 validating the path groups by issuing a command to the channel subsystem 20 to verify the logical and physical paths to the I/O device 26a, b, c to which the alias UCB was added and updating the alias and base UCBs with the status information on the I/O device 26a, b obtained from the channel subsystem 20. Control transfers to block 204 which represents the host 16 releasing the locks on the UCB and ULUT 36 and then completing the binding program at block 206.

Figure 14:
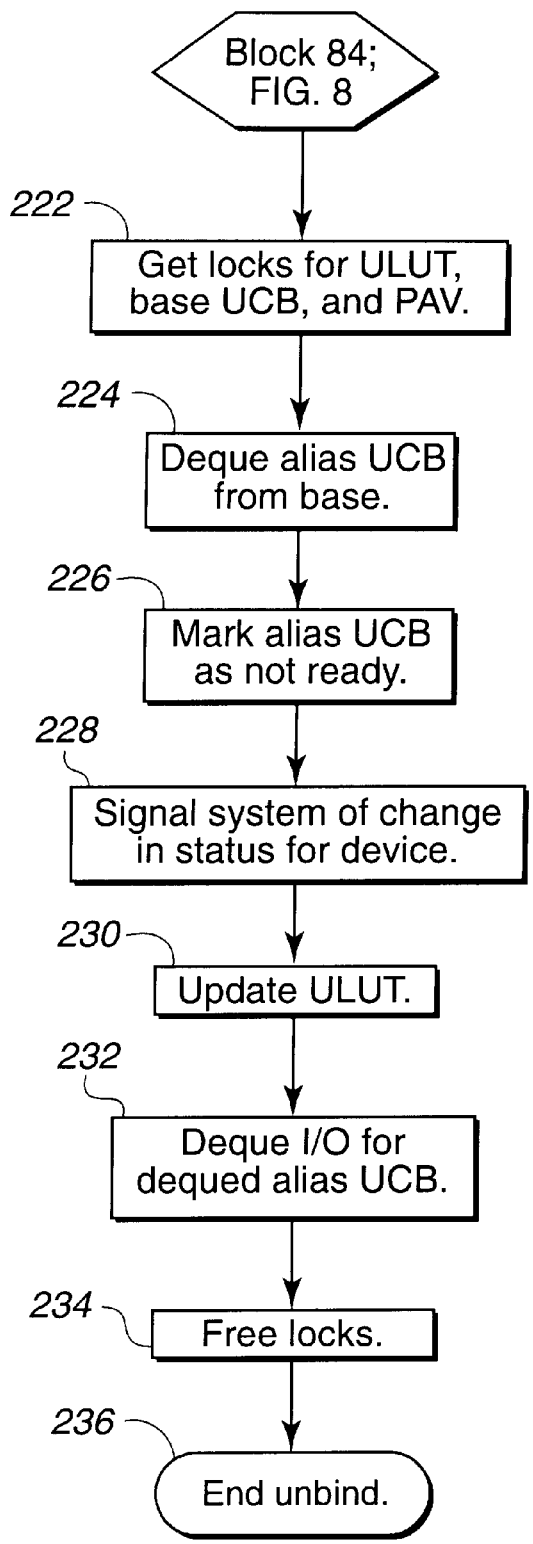
FIG. 14 illustrates logic to unbind an alias from a base address in accordance with preferred embodiments of the present invention.

FIG. 14 illustrates logic to perform the step of unbinding the alias from the base at block 84 in FIG. 8. As discussed, at block 82 in FIG. 8, the alias UCB is unbound if the current alias UCB binding is invalid. To unbind an alias UCB, control begins at block 222, which represents the host 16 obtaining locks for the ULUT 36, the base UCB to which the alias UCB is currently bound, and the PAV facility. Control transfers to block 224 which represents the host 16 dequeueing the alias UCB from the base. The host 16 would go through the circular PAV queue and remove the address from the alias or base UCB pointing to the alias UCB to unbind the alias UCB. If an alias UCB was pointing to the alias UCB to unbind, then the host 16 would have the alias UCB point to the base or alias UCB the alias to unbind was addressing. After dequeueing the alias UCB from the PAV circular queue, control transfers to block 226 which represents the host 16 marking the alias UCB as not ready or unavailable. Control then transfers to block 228 which represents the host 16 signaling the system of the change in status for the device. Control transfers to block 230 which represents the host 16 updating the ULUT 36 to indicate that the alias UCB dequeued is not binded. Control transfers to block 232 which represents the host 16 dequeueing I/O requests to the dequeued alias UCB. Control then proceeds to block 234 to free all the locks and then to block 236 to end the unbind procedure.

Related patent application "Method and System for Reassigning Addresses To An Input/Output Device," U.S. application Ser. No. 09/167,603, which was incorporated by reference above, describes a method and system for reassigning alias addresses to different base addresses within a logical subsystem (LSS).

Conclusion

This concludes the description of the preferred embodiments of the invention. The following describes some alternative embodiments for accomplishing the present invention.

Preferred embodiments were described as implemented in a mainframe operating system, such as the IBM S/390 system where read write operations involve different commands, such as the define extent portion, locate record portion, and actual read/write command. However, those skilled in the art will appreciate that the use of base and alias addressing to direct I/O operations concurrently to the same volume can be used with other data transfer interfaces known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

Preferred embodiments were described with respect to a host system that communicates with a channel subsystem, which in turn communicates via channel paths to control units, which access the I/O devices. In alternative embodiments, the data paths may extend from the channel subsystem directly to the I/O device or, alternatively from the host system directly to the I/O device.

Preferred embodiments described a storage controller that communicates with a host system. However, in alternative embodiments the storage controller and host system may be any processing units or systems operating under microprocessor control.

In summary, preferred embodiments in accordance with the present invention provide a system for addressing an input/output (I/O) device. A first processing unit queries a second processing unit for information on base and associated alias addresses for at least one I/O device. The first processing unit processes the queried information to generate at least one base control block indicating a base address and a plurality of alias control blocks indicating a plurality of alias addresses. Each control block is associated with an address for addressing an I/O device. The first processing unit processes at least one alias control block associated with the I/O device and determines a base control block associated with the I/O device with which the alias control blocks are associated. The first processing unit then binds at least one alias control block to the determined base control block. The bound base and alias control blocks provide different addresses to address the same I/O device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for addressing an input/output (I/O) device, comprising the steps of:

querying, with a first processing unit, a second processing unit for information on base and associated alias addresses for at least one I/O device;

processing, with the first processing unit, the queried information to generate at least one base control block indicating a base address and a plurality of alias control blocks indicating a plurality of alias addresses, wherein each control block is associated with an address for addressing an I/O device;

processing, with the first processing unit, at least one alias control block associated with the I/O device;

determining, with the first processing unit, a base control block associated with the I/O device with which the alias control blocks are associated; and binding, with the first processing unit, at least one alias control block to the determined base control block, wherein bound base and alias control blocks provide different addresses to address the same I/O device.

2. A method for addressing an input/output (I/O) device, comprising the steps of:

providing at least one base control block indicating a base address and a plurality of alias control blocks indicating a plurality of alias addresses, wherein each control block is associated with an address for addressing an I/O device;

processing at least one alias control block associated with the I/O device;

determining a base control block associated with the I/O device with which the alias control blocks are associated; and binding at least one alias control block to the determined base control block, wherein bound base and alias control blocks provide different addresses to address the same I/O device, and wherein the bound base and alias addresses address the same I/O device for subsequent I/O operations until a reassignment of the association of base and alias addresses is detected.

3. The method of claim 2, wherein the I/O device is a logical volume included in a storage device comprised of multiple logical volumes, wherein the base and alias addresses address logical volumes.

4. The method of claim 2, wherein the step of binding the alias control blocks to the base control block further includes the step of setting a pointer in the base control block to address at least one alias control block and setting a pointer in the alias control blocks to address at least one other alias control block addressing the same I/O device.

5. The method of claim 2, wherein the step of processing the alias control blocks comprise accessing an alias record indicating a first code identifying a storage controller controlling access to the I/O device and a second code identifying the I/O device associated with the alias control block, and wherein the step of determining the base control block comprises:
   (i) searching a data structure associated with the first code that includes a linked list of second codes, wherein each second code points to a base control block;
   (ii) determining a second code in the data structure matching the second code from the alias record; and
   (iii) determining the base control block associated with the alias control block by processing the pointer from the determined second code to the base control block.

6. The method of claim 2, further comprising the step of providing a record table including a base record indicating a first code for a storage controller and a second code for the I/O device associated with the base record, wherein the step of processing the alias address further comprises requesting an alias record indicating:
   (i) the first code for the storage controller;
   (ii) the second code for the I/O device associated with the alias record;
   (iii) a flag indicating that the address associated with the record is an alias address; and
   (iv) a field indicating that the alias address is not bound to a base control block.

7. The method of claim 6, wherein the step of processing the alias control block further comprises the steps of:
   determining whether the alias control block is bound to a base control block;
   determining whether the first and second codes in the alias record match the first and second codes in the base record; and
   unbinding the alias control block from the base control block after determining that at least one of the codes in the base and alias records do not match by dequeueing the alias control block being unbound from a queue of the base and alias control blocks.

8. The method of claim 2, wherein the step of determining a base control block further comprises the step of determining a compatibility of the base and alias control blocks by performing the steps of:
   determining data path identification information for the base and alias control blocks identifying data paths associated with the base and alias control blocks that provide communication between the processing unit and a storage controller controlling access to the I/O device;
   determining whether the data path identification information for the base and alias control blocks matches; and
   performing the step of binding the alias control block to the base control block after determining that the data path identification information for the base and alias control blocks matches.

9. The method of claim 8, wherein the step of determining the compatibility of the base and alias control blocks further comprises the steps of:

determining storage controller information for the base and alias control blocks identifying the storage controller associated with the base and alias control blocks;
determining whether the storage controller identification information for the base and alias control blocks matches; and
performing the step of binding the alias control block to the base control block after determining that the storage controller identification information for the base and alias control blocks matches.

10. The method of claim 9, further including the steps of setting pointers in the alias control blocks to address the base control block, wherein the pointers for the base and alias control blocks form a circular queue.

11. A method implemented within a control unit for addressing an input/output (I/O) device and for communicating with a processing unit, comprising the steps of:
   providing in a memory area accessible to the control unit a base address and a plurality of alias addresses for addressing the I/O device, wherein the alias addresses associated with the base address provides an address for addressing the I/O device addressed by the base address;
   receiving a request, with the control unit, from the processing unit for information on the assignment of base and alias addresses to the I/O device; and
   transmitting, with the control unit, information on the assignment of base and alias addresses for the I/O device to the processing unit after receiving the request from the processing unit, wherein the processing unit uses the assignment information for configuration purposes.

12. The method of claim 11, wherein there are a plurality of base and alias addresses and I/O devices, wherein each base address addresses one I/O device and wherein alias addresses associated with a base address addresses the device addressed by the base address, wherein the assignment information comprises information on the association of base and alias addresses to I/O devices.

13. The method of claim 12, wherein the step of providing base and alias addresses comprises the step of providing, with the control unit, a unit address control block (UACB) for each base and alias address including status information on the device addressed by the base and alias addresses, wherein an alias UACB includes a pointer to the associated base UACB.

14. The method of claim 12, wherein the control unit is a storage controller, the I/O devices are logical volumes in a storage device, and wherein a base address and at least one alias address addresses a logical volume.

15. The method of claim 11, further comprising the steps of:
   receiving, with the control unit, an I/O request on an alias address from the processing unit;
   determining, with the control unit, the base address associated with the alias address on which the I/O request was received; and
   executing, with the control unit, the I/O request against the determined base address.

16. A method implemented within a storage controller for addressing a storage device unit, comprising the steps of:
   providing in a memory area accessible to the storage controller a base address and a plurality of alias addresses for addressing locations in the storage device unit, wherein the alias addresses associated with the base address provides an address for addressing the location in the storage device unit addressed by the base address;

receiving a request, with the storage controller, from a computer system for information on the assignment of base and alias addresses to the storage device unit; and transmitting, with the storage controller unit, information on the assignment of base and alias addresses to the storage device unit to the computer system after receiving the request from the computer system, wherein the computer system uses the assignment information for configuration purposes.

17. The method of claim 16, wherein there are a plurality of base and alias addresses, wherein each base address addresses a location in the storage device unit and wherein alias addresses associated with a base address address the location addressed by the base address, wherein the assignment information comprises information on the association of base and alias addresses to the storage device unit.

18. The method of claim 17, wherein the step of providing base and alias addresses comprises the step of providing, with the storage controller, a unit address control block (UACB) for each base and alias address including status information on the location in the storage device unit addressed by the base and alias addresses, wherein an alias UACB includes a pointer to the associated base UACB.

19. The method of claim 16, wherein the locations in the storage device unit are logical volumes, and wherein a base address and at least one alias address addresses a logical volume.

20. The method of claim 16, further comprising the steps of;

receiving, with the storage controller, an I/O request on an alias address from the computer system;

determining, with the storage controller, the base address associated with the alias address on which the I/O request was received; and executing, with the storage controller, the I/O request against the determined base address.

21. A system for addressing an input/output (I/O) device and for communicating with a control unit, comprising:

a processing unit;

a first memory area accessible to the processing unit, including information indicating an association of at least one alias address to a base address, wherein the base and associated alias addresses are capable of being used to address the I/O device;

control logic executed by the processing unit, including:
  (i) means for querying the control unit for information on base and associated alias addresses for the I/O device;
  (ii) means for processing the queried information to generate at least one base control block indicating a base address and a plurality of alias control blocks indicating a plurality of alias addresses, wherein each control block is associated with an address for addressing an I/O device;
  (iii) means for processing at least one alias control block associated with the I/O device;
  (iv) means for determining a base control block associated with the I/O device with which the alias control blocks are associated; and
  (v) means for binding at least one alias control block to the determined base control block, wherein bound base and alias control blocks provide different addresses to address the same I/O device.

22. A system for addressing an input/output (I/O) device, comprising:

a processing unit;

a memory area accessible to the processing unit including at least one base control block indicating a base address and a plurality of alias control blocks indicating a plurality of alias addresses, wherein each control block is associated with an address for addressing the I/O device;

control logic executed by the processing unit, comprising:
  (i) means for processing at least one alias control block associated with the I/O device;
  (ii) means for determining a base control block associated with the I/O device with which the alias control blocks are associated; and
  (iii) means for binding at least one alias control block to the determined base control block, wherein bound base and alias control blocks provide different addresses to address the same I/O device, and wherein the bound base and alias addresses address the same I/O device for subsequent I/O operations until the processing unit detects a reassignment of the association of base and alias addresses.

23. The system of claim 22, wherein the step of binding the alias control blocks to the base control block further includes the step of setting a pointer in the base control block to address at least one alias control block and setting a pointer in the alias control blocks to address at least one other alias control block addressing the same I/O device.

24. The system of claim 22, wherein the control logic further comprises:

means for accessing an alias record indicating a first code identifying a storage controller controlling access to the I/O device and a second code identifying the I/O device associated with the alias control block;

means for searching a data structure associated with the first code that includes a linked list of second codes, wherein each second code points to a base control block;

means for determining a second code in the data structure matching the second code from the alias record; and means for determining the base control block associated with the alias control block by processing the pointer from the determined second code to the base control block.

25. The system of claim 22, wherein the memory area further includes a record table including a base record indicating a first code for a storage controller and a second code for the I/O device associated with the base record, wherein the control logic further includes means for accessing an alias record indicating:
  (i) the first code for the storage controller;
  (ii) the second code for the I/O device associated with the alias record;
  (iii) a flag indicating that the address associated with the record is an alias address; and
  (iv) a field indicating that the alias address is not bound to a base control block.

26. The system of claim 25, wherein the control logic further includes:

means for determining whether the alias control block is bound to a base control block;

means for determining whether the first and second codes in the alias record match the first and second codes in the base record; and means for unbinding the alias control block from the base control block after determining that at least one of the codes in the base and alias records do not match by dequeueing the alias control block being unbound from a queue of the base and alias control blocks.

27. The system of claim 22, wherein the control logic further comprises:
   means for determining data path identification information for the base and alias control blocks identifying data paths associated with the base and alias control blocks that provide communication between the processing unit and a storage controller controlling access to the I/O device;
   means for determining whether the data path identification information for the base and alias control blocks matches; and
   means for performing the step of binding the alias control block to the base control block after determining that the data path identification information for the base and alias control blocks matches.

28. The system of claim 27, wherein the control logic further comprises:
   means for determining storage controller information for the base and alias control blocks identifying the storage controller associated with the base and alias control blocks;
   means for determining whether the storage controller identification information for the base and alias control blocks matches; and
   means for performing the step of binding the alias control block to the base control block after determining that the storage controller identification information for the base and alias control blocks matches.

29. The system of claim 28, wherein the control logic further includes means for setting pointers in the alias control blocks to address the base control block, wherein the pointers for the base and alias control blocks form a circular queue.

30. A system for addressing an input/output (I/O) device and for communicating with a processing unit, comprising:
   a control unit;
   a memory area accessible to the control unit, including a base address and a plurality of alias addresses for addressing the I/O device, wherein the alias addresses associated with the base address provides an address for addressing the I/O device addressed by the base address;
   control logic executed within the control unit, comprising:
      (i) means for receiving a request from the processing unit for information on the assignment of base and alias addresses to the I/O device; and
      (ii) means for transmitting information on the assignment of base and alias addresses to the I/O device to the processing unit after receiving the request from the processing unit, wherein the processing unit uses the assignment information for configuration purposes.

31. The system of claim 30, wherein there are a plurality of I/O devices, and base and alias addresses, wherein each base address addresses one I/O device and wherein alias addresses associated with a base address addresses the device addressed by the base address, wherein the assignment information comprises information on the association of base and alias addresses to I/O devices.

32. The system of claim 31, wherein the memory further comprises a unit address control block (UACB) for each base and alias address including status information on the device addressed by the base and alias addresses, wherein an alias UACB includes a pointer to the associated base UACB.

33. The system of claim 31, wherein the control unit is a storage controller, the I/O devices are logical volumes in a storage device, and wherein a base address and at least one alias address addresses a logical volume.

34. The system of claim 30, wherein the control logic further comprises:
   means for receiving an I/O request on an alias address from the processing unit;
   means for determining the base address associated with the alias address on which the I/O request was received; and
   means for executing the I/O request against the determined base address.

35. A storage controller for addressing a storage device unit and for communicating with a computer system over a network communication line, comprising:
   a controller processing unit;
   a memory area accessible to the controller processing unit, including a base address and a plurality of alias addresses for addressing locations in the storage device unit, wherein the alias addresses associated with the base address provides an address for addressing the location in the storage device unit addressed by the base address;
   control logic executed by the controller processing unit, comprising:
      (i) means for receiving a request from the computer system for information on the assignment of base and alias addresses to the storage device unit; and
      (ii) means for transmitting information on the assignment of base and alias addresses to the storage device unit to the computer system after receiving the request from the computer system, wherein the computer system uses the assignment information for configuration purposes.

36. The storage controller of claim 35, wherein there are a plurality of base and alias addresses, wherein each base address addresses a location in the storage device unit and wherein alias addresses associated with a base address address the location addressed by the base address, wherein the assignment information comprises information on the association of base and alias addresses to the storage device unit.

37. The storage controller of claim 36, wherein the control logic further comprises means for providing a unit address control block (UACB) for each base and alias address including status information on the location in the storage device unit addressed by the base and alias addresses, wherein an alias UACB includes a pointer to the associated base UACB.

38. The storage controller of claim 35, wherein the locations in the storage device unit are logical volumes, and wherein a base address and at least one alias address addresses a logical volume.

39. The storage controller of claim 35, wherein the control logic further comprises:
   means for receiving an I/O request on an alias address from the computer system;
   means for determining the base address associated with the alias address on which the I/O request was received; and
   means for executing the I/O request against the determined base address.

40. An article of manufacture for use in programming a first processing unit to address an input/output (I/O) device, the article of manufacture comprising at least one computer readable storage device including at least one computer program embedded therein that causes the first processing unit to perform the steps of:

querying a second processing unit for information on base and associated alias addresses for at least one I/O device;

processing the queried information to generate at least one base control block indicating a base address and a plurality of alias control blocks indicating a plurality of alias addresses, wherein each control block is associated with an address for addressing an I/O device;

processing at least one alias control block associated with the I/O device;

determining a base control block associated with the I/O device with which the alias control blocks are associated; and binding at least one alias control block to the determined base control block, wherein bound base and alias control blocks provide different addresses to address the same I/O device.

41. An article of manufacture for use in programming a first processing unit to address an input/output (I/O) device, the article of manufacture comprising at least one computer readable storage device including at least one computer program embedded therein that causes the first processing unit to perform the steps of:

providing at least one base control block indicating a base address and a plurality of alias control blocks indicating a plurality of alias addresses, wherein each control block is associated with an address for addressing an I/O device;

processing at least one alias control block associated with the I/O device;

determining a base control block associated with the I/O device with which the alias control blocks are associated; and binding at least one alias control block to the determined base control block, wherein bound base and alias control blocks provide different addresses to address the same I/O device, and wherein the bound base and alias addresses address the same I/O device for subsequent I/O operations until the processing unit detects a reassignment of the association of base and alias addresses.

42. The article of manufacture of claim 41, wherein the step of binding the alias control blocks to the base control block further includes the step of setting a pointer in the base control block to address at least one alias control block and setting a pointer in the alias control blocks to address at least one other alias control block addressing the same I/O device.

43. The article of manufacture of claim 41, wherein the step of processing the alias control blocks comprises accessing an alias record indicating a first code identifying a storage controller controlling access to the I/O device and a second code identifying the I/O device associated with the alias control block, and wherein the step of determining the base control block comprises:

(i) searching a data structure associated with the first code that includes a linked list of second codes, wherein each second code points to a base control block;

(ii) determining a second code in the data structure matching the second code from the alias record; and (iii) determining the base control block associated with the alias control block by processing the pointer from the determined second code to the base control block.

44. The article of manufacture of claim 41, further comprising the step of providing a record table including a base record indicating a first code for a storage controller and a second code for the I/O device associated with the base record, wherein the step of processing the alias address further comprises requesting an alias record indicating:

(i) the first code for the storage controller;

(ii) the second code for the I/O device associated with the alias record;

(iii) a flag indicating that the address associated with the record is an alias address; and (iv) a field indicating that the alias address is not bound to a base control block.

45. The article of manufacture of claim 44, wherein the step of processing the alias control block further comprises the steps of:

determining whether the alias control block is bound to a base control block;

determining whether the first and second codes in the alias record match the first and second codes in the base record; and unbinding the alias control block from the base control block after determining that at least one of the codes in the base and alias records do not match by dequeueing the alias control block being unbound from a queue of the base and alias control blocks.

46. The article of manufacture of claim 41, wherein the step of determining a base control block further comprises the step of determining a compatibility of the base and alias control blocks by performing the steps of:

determining data path identification information for the base and alias control blocks identifying data paths associated with the base and alias control blocks that provide communication between the processing unit and a storage controller controlling access to the I/O device;

determining whether the data path identification information for the base and alias control blocks matches; and performing the step of binding the alias control block to the base control block after determining that the data path identification information for the base and alias control blocks matches.

47. The article of manufacture of claim 46, wherein the step of determining the compatibility of the base and alias control blocks further comprises the steps of:

determining storage controller information for the base and alias control blocks identifying the storage controller associated with the base and alias control blocks;

determining whether the storage controller identification information for the base and alias control blocks matches; and performing the step of binding the alias control block to the base control block after determining that the storage controller identification information for the base and alias control blocks matches.

48. The article of manufacture of claim 47, further including the steps of setting pointers in the alias control blocks to address the base control block, wherein the pointers for the base and alias control blocks form a circular queue.

49. An article of manufacture for use in programming a control unit to address an input/output (I/O) device, the article of manufacture comprising at least one computer readable storage device including at least one computer program embedded therein that causes the control unit to perform the steps of:

providing in a memory area accessible to the control unit a base address and a plurality of alias addresses for addressing the I/O device, wherein the alias addresses associated with the base address provides an address for addressing the I/O device addressed by the base address;

receiving a request from a processing unit for information on the assignment of base and alias addresses to the I/O device; and transmitting information on the assignment of base and alias addresses to the I/O device to the processing unit after receiving the request from the processing unit, wherein the processing unit uses the assignment information for configuration purposes.

50. The article of manufacture of claim 49, wherein there are a plurality of base and alias addresses, wherein each base address addresses one I/O devices and wherein alias addresses associated with a base address addresses the device addressed by the base address, wherein the assignment information comprises information on the association of base and alias addresses to I/O devices.

51. The article of manufacture of claim 50, wherein the step of providing base and alias addresses comprises the step of providing a unit address control block (UACB) for each base and alias address including status information on the device addressed by the base and alias addresses, wherein an alias UACB includes a pointer to the associated base UACB.

52. The article of manufacture of claim 50, wherein the control unit is a storage controller, the I/O devices are logical volumes in a storage device, and wherein a base address and at least one alias address addresses a logical volume.

53. The article of manufacture of claim 49, further comprising the steps of:

receiving an I/O request on an alias address from the processing unit;

determining the base address associated with the alias address on which the I/O request was received; and executing the I/O request against the determined base address.

54. An article of manufacture for use in programming a storage controller to address a storage device unit, the article of manufacture comprising at least one computer readable storage device including at least one computer program embedded therein that causes the storage controller to perform the steps of:

providing in a memory area accessible to the storage controller a base address and a plurality of alias addresses for addressing locations in the storage device unit, wherein the alias addresses associated with the base address provides an address for addressing the location in the storage device unit addressed by the base address;

receiving a request from a computer system for information on the assignment of base and alias addresses to the storage device unit; and transmitting information on the assignment of base and alias addresses to the storage device unit to the computer system after receiving the request from the computer system, wherein the computer system uses the assignment information for configuration purposes.

55. The article of manufacture of claim 54, wherein there are a plurality of base and alias addresses, wherein each base address addresses a location in the storage device unit and wherein alias addresses associated with a base address address the location addressed by the base address, wherein the assignment information comprises information on the association of base and alias addresses to the storage device unit.

56. The article of manufacture of claim 55, wherein the step of providing base and alias addresses comprises the step of providing a unit address control block (UACB) for each base and alias address including status information on the location in the storage device unit addressed by the base and alias addresses, wherein an alias UACB includes a pointer to the associated base UACB.

57. The article of manufacture of claim 54, wherein the locations in the storage device unit are logical volumes, and wherein a base address and at least one alias address addresses a logical volume.

58. The article of manufacture of claim 54, further comprising the steps of;

receiving an I/O request on an alias address from the computer system;

determining the base address associated with the alias address on which the I/O request was received; and executing the I/O request against the determined base address.

\* \* \* \* \*